United States Patent
Seo et al.

(10) Patent No.: US 9,924,536 B2
(45) Date of Patent: Mar. 20, 2018

(54) COMMUNICATION METHOD FOR TERMINAL IN WIRELESS COMMUNICATION SYSTEM AND TERMINAL USING SAME

(71) Applicant: LG Electronics Inc., Seoul (KR)

(72) Inventors: Dongyoun Seo, Seoul (KR); Yunjung Yi, Seoul (KR); Bonghoe Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/892,263

(22) PCT Filed: May 22, 2014

(86) PCT No.: PCT/KR2014/004573
§ 371 (c)(1),
(2) Date: Nov. 19, 2015

(87) PCT Pub. No.: WO2014/189304
PCT Pub. Date: Nov. 27, 2014

(65) Prior Publication Data
US 2016/0128089 A1    May 5, 2016

Related U.S. Application Data

(60) Provisional application No. 61/826,472, filed on May 22, 2013, provisional application No. 61/830,614, filed on Jun. 3, 2013.

(51) Int. Cl.
*H04Q 7/00* (2006.01)
*H04W 72/12* (2009.01)
(Continued)

(52) U.S. Cl.
CPC .......... *H04W 72/1294* (2013.01); *H04B 7/26* (2013.01); *H04B 7/2656* (2013.01);
(Continued)

(58) Field of Classification Search
CPC ......... H04W 72/1294; H04W 72/1284; H04W 72/14; H04L 1/1812; H04L 1/1607; H04L 5/00; H04B 7/2656; H04B 7/26
(Continued)

(56) References Cited

U.S. PATENT DOCUMENTS 9,049,704 B2 *   6/2015   Yang ..................... H04L 1/1861
9,148,262 B2 *   9/2015   Yang ..................... H04W 72/14
(Continued)

FOREIGN PATENT DOCUMENTS

EP            2538738 A1      12/2012
KR     10-2012-0127440 A      11/2012
(Continued)

OTHER PUBLICATIONS

International Search Report issued in corresponding International Patent Application No. PCT/KR2014/004573 dated Aug. 22, 2014.
(Continued)

*Primary Examiner* — Chuong T Ho
(74) *Attorney, Agent, or Firm* — Morgan, Lewis & Bockius LLP

(57) ABSTRACT

A communication method for a terminal in a wireless communication system and a terminal using the method are provided. The method comprises: a first downlink subframe receiving a downlink grant; and a plurality of downlink subframes receiving a plurality of data channels that are scheduled by the downlink grant, wherein the plurality of downlink subframes belong to a predetermined downlink subframe group.

11 Claims, 15 Drawing Sheets

(51) Int. Cl.
*H04B 7/26* (2006.01)
*H04L 5/00* (2006.01)
*H04L 1/16* (2006.01)
*H04L 1/18* (2006.01)
*H04W 72/14* (2009.01)

(52) U.S. Cl.
CPC .......... *H04L 1/1607* (2013.01); *H04L 1/1812* (2013.01); *H04L 5/00* (2013.01); *H04W 72/1284* (2013.01); *H04W 72/14* (2013.01)

(58) Field of Classification Search
USPC ........................................ 370/329, 330, 328
See application file for complete search history.

(56) References Cited

U.S. PATENT DOCUMENTS

| | | | | |
|---|---|---|---|---|
| 2013/0039296 | A1* | 2/2013 | Damnjanovic ... | H04W 72/1289 370/329 |
| 2013/0201954 | A1* | 8/2013 | Gao ................ | H04W 72/0413 370/329 |
| 2013/0223300 | A1 | 8/2013 | Yang et al. | |
| 2014/0112261 | A1* | 4/2014 | Chen .................... | H04B 7/2656 370/329 |
| 2014/0126491 | A1* | 5/2014 | Ekpenyong .......... | H04L 5/0055 370/329 |
| 2014/0328332 | A1* | 11/2014 | Yang .................... | H04W 72/14 370/336 |
| 2015/0312934 | A1* | 10/2015 | Chen .................... | H04L 1/1861 370/329 |

FOREIGN PATENT DOCUMENTS

| | | |
|---|---|---|
| KR | 10-2013-0005192 A | 1/2013 |
| WO | 2012/091490 A2 | 7/2012 |

OTHER PUBLICATIONS

China Telecom, "Discussion on multi-subframing scheduling," R1-131137, 3GPP TSG RAN WG1 Meeting #72bis, Chicago, USA, Apr. 15-19, 2013.

Samsung, "Considerations on Multi-Subframe Scheduling," R1-131023, 3GPP TSG RAN WG1 #72 bis, Chicago, USA, Apr. 15-19, 2013.

* cited by examiner

FIG. 13
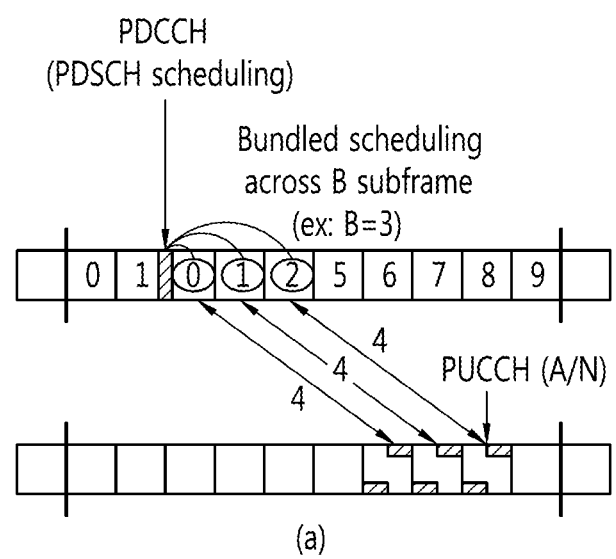
(a)
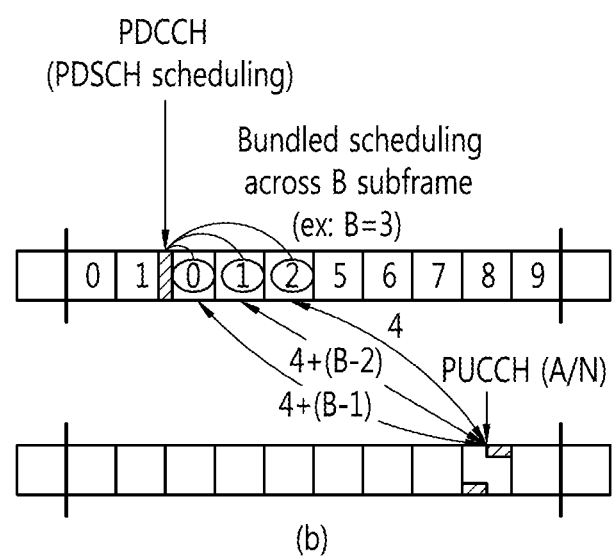
(b)

COMMUNICATION METHOD FOR TERMINAL IN WIRELESS COMMUNICATION SYSTEM AND TERMINAL USING SAME

BACKGROUND OF THE INVENTION

Field of the Invention

The present invention relates to wireless communication, and more particularly, to a communication method for a terminal in a wireless communication system and a terminal using the same.

Related Art

In a future wireless communication system, machine type communication (MTC), carrier aggregation using different time division duplex (TDD) UL-DL (uplink-downlink) configurations, and the like may be used and various types of services may be provided. As a result, in the future wireless communication system, an increase in the number of terminals which are simultaneously scheduled is anticipated. Accordingly, it may be difficult to perform smooth scheduling on an existing control channel scheduling a data channel.

In long term evolution (LTE), a control channel transmitting control information is a physical downlink control channel (PDCCH). In order to solve a resource shortage phenomenon of the PDCCH, bundled scheduling for scheduling physical downlink shared channels (PDSCHs) transmitted through a plurality of subframes or a plurality of CCs through one PDCCH, cross-subframe scheduling for flexibility of PDCCH application, and the like have been considered. Further, unlike the existing PDCCH, introduction of an enhanced-PDCCH (e-PDCCH) configuring the control channel in the PDSCH region has been also considered.

However, which subframe the bundled scheduling or the cross-subframe scheduling is to be applied needs to be prescribed.

Meanwhile, in the related art, in an uplink, synchronous hybrid automatic repeat request (HARQ) in which a transmission time of ACK/NACK corresponding to a data receiving time is fixed and determined is adopted. When the bundled scheduling or cross-subframe scheduling is adopted, which method the ACK/NACK transmission time is determined by needs also to be prescribed.

SUMMARY OF THE INVENTION

The present invention has been made in an effort to provide a communication method for a terminal in a wireless communication system and a terminal using the same.

In an aspect, provided is a communication method for a terminal in a wireless communication system. The method includes receiving a downlink grant in a first downlink subframe and receiving a plurality of data channels scheduled by the downlink grant in a plurality of downlink subframes. The plurality of downlink subframes are included in any one of predetermined downlink subframe sets.

An uplink grant may be received in the first downlink subframe, and acknowledgements/non-acknowledgements (ACKs/NACKs) for the plurality of data channels may be transmitted in a first uplink subframe, and the uplink grant may include information indicating the first uplink subframe.

The first uplink subframe may be determined according to a hybrid automatic repeat request (HARQ) process number indicated by the uplink grant.

The HARQ process number may be determined according to a value of a demodulation reference signal (DM-RS) field included in the uplink grant.

The DM-RS field may be a field indicating a cyclic shift value of the DM-RS to be applied to the first uplink subframe.

The DM-RS field may be constituted by 3 bits.

The downlink subframe sets may be determined based on a CP length and the presence of a positioning reference signal (PRS) of the downlink subframe.

The downlink subframe sets may be determined based on a transmission power value of the downlink subframe.

The downlink subframe sets may be determined based on whether a physical multicast channel (PMCH) being transmitted in the downlink subframe.

The downlink subframe sets may be predetermined to be signaled to the terminal.

In another aspect, provided is a terminal. The terminal includes a radio frequency (RF) unit transmitting or receiving a radio signal and a processor connected with the RF unit. The processor receives a downlink grant in a first downlink subframe, and receives a plurality of data channels scheduled by the downlink grant in a plurality of downlink subframes, and the plurality of downlink subframes are included in any one of predetermined downlink subframe sets.

According to the present invention, a subframe configuration reference to apply bundled scheduling or cross-subframe scheduling is provided and ACK/NACK can be efficiently transmitted at the time of applying the scheduling methods.

BRIEF DESCRIPTION OF THE DRAWINGS

FIG. 13 illustrates an example of cross subframe scheduling.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
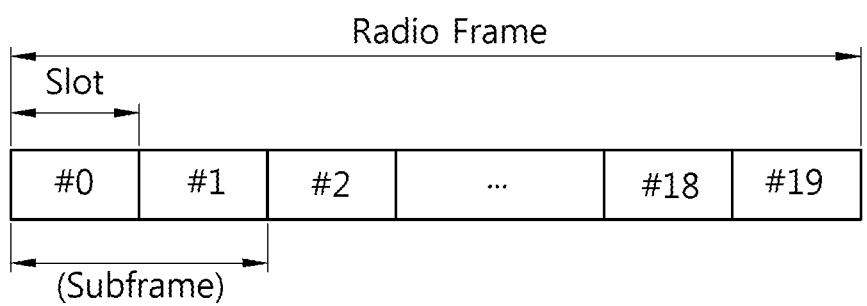
FIG. 1 shows a downlink radio frame structure in 3rd generation partnership project (3GPP) long term evolution (LTE).

FIG. 1 shows a downlink radio frame structure in 3rd generation partnership project (3GPP) long term evolution (LTE). The section 4 of 3GPP TS 36.211 V8.7.0 (2009-05) "Evolved Universal Terrestrial Radio Access (E-UTRA); Physical Channels and Modulation (Release 8)" may be incorporated herein by reference for time division duplex (TDD).

The radio frame includes 10 subframes having indexes of 0 to 9. One subframe includes two consecutive slots. A time required to transmit one subframe is referred to as a transmission time interval (TTI). The length of one subframe may be 1 ms and the length of one slot may be 0.5 ms.

Figure 2:
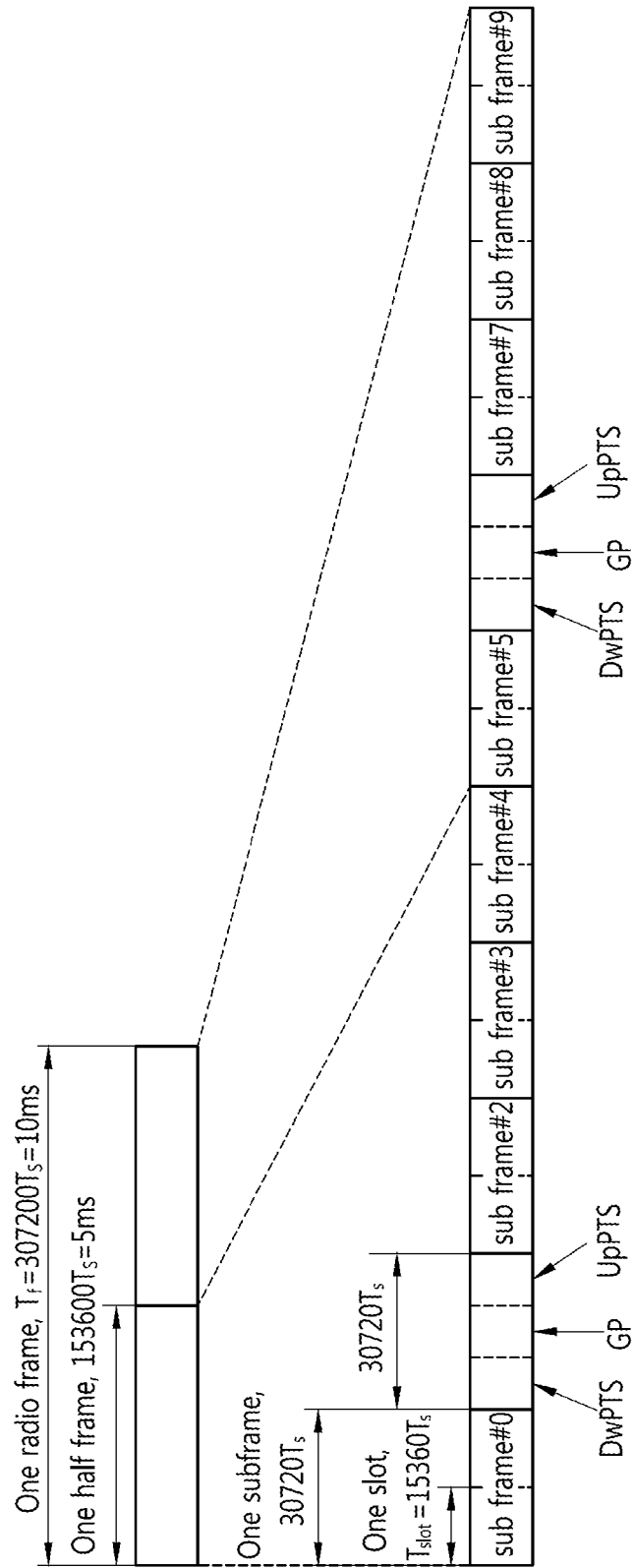
FIG. 2 illustrates a structure of a time division duplex (TDD) radio frame in 3GPP LTE.

FIG. 2 illustrates a structure of a time division duplex (TDD) radio frame in 3GPP LTE.

In the TDD radio frame, a downlink (DL) subframe, an uplink (UL) subframe, and a specific subframe may coexit.

Table 1 illustrates one example of a UL-DL configuration of the radio frame.

TABLE 1

| Uplink-downlink configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' represents a DL subframe, 'U' represents a UL subframe, and 'S' represents a special subframe. When user equipment receives the UL-DL configuration from a base station, the user equipment may determine which subframe is the DL subframe or the UL subframe according to the configuration of the radio frame.

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

Meanwhile, each OFDM symbol in the subframe may include a cyclic prefix (CP). In the case of a normal CP, a CP interval in the OFDM symbol may be 5.2 us (micro second) and in the case of an extended CP, the CP interval may be 16.7 us (micro second). In the case of the CP, one OFDM symbol is 71.9 us and in the case of the extended Cp, one OFDM symbol is 83.3 us (when subcarrier spacing is 15 kHz).

Figure 3:
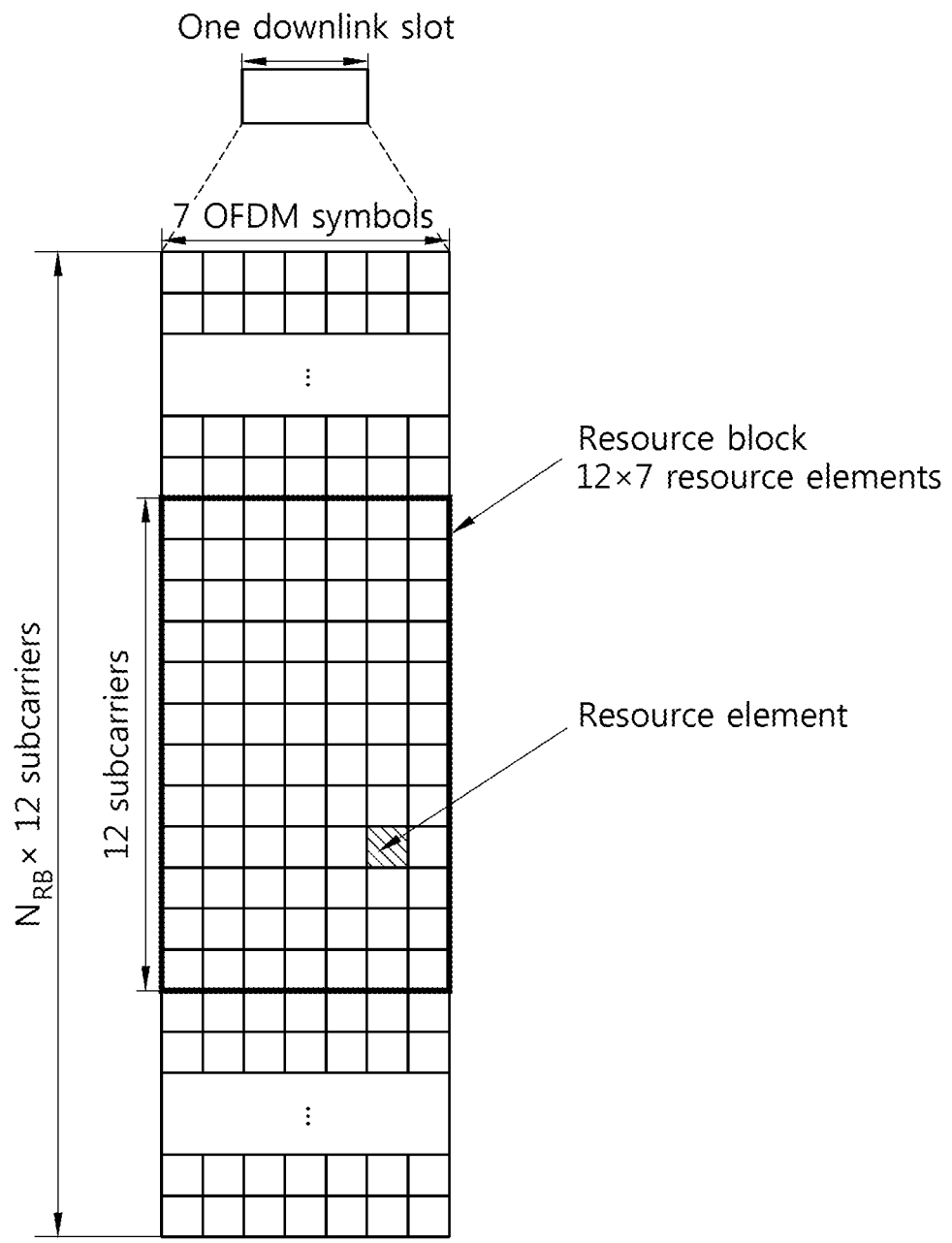
FIG. 3 illustrates one example of a resource grid for one downlink slot.

FIG. 3 illustrates one example of a resource grid for one downlink slot.

Referring to FIG. 3, the downlink slot may include a plurality of OFDM symbols in a time domain and $N_{RB}$ resource blocks (RBs) in a frequency domain. The resource block as the resource allocation unit includes one slot in the time domain and a plurality of contiguous subcarriers in the frequency domain. The number $N_{RB}$ of resource blocks included in the downlink slot is subordinate to a downlink bandwidth set in a cell. For example, in an LTE system, $N_{RB}$ may be any one of 6 to 110. The structure of an uplink slot may also be the same as that of the downlink slot.

Each element on the resource grid is called a resource element (RE). The resource element on the resource grid may be identified by a pair of indexes (k,l) in the slot. Herein, k (k=0, . . . , $N_{RB} \times 12-1$) represents a subcarrier index in the frequency domain, and l (l=0, . . . , 6) represents an OFDM symbol index in the time domain.

In FIG. 3, it is exemplarily described that one resource block is constituted by 7 OFDM symbols in the time domain and 12 subcarriers in the frequency domain and thus includes 7×12 resource elements, but the number of the OFDM symbols and the number of the subcarriers in the resource block are not limited thereto. The number of the OFDM symbols and the number of the subcarriers may be variously changed depending on the length of the CP, frequency spacing, and the like. As the number of subcarriers in one OFDM symbol, one of 128, 256, 512, 1024, 1536, and 2048 may be selected and used.

Figure 4:
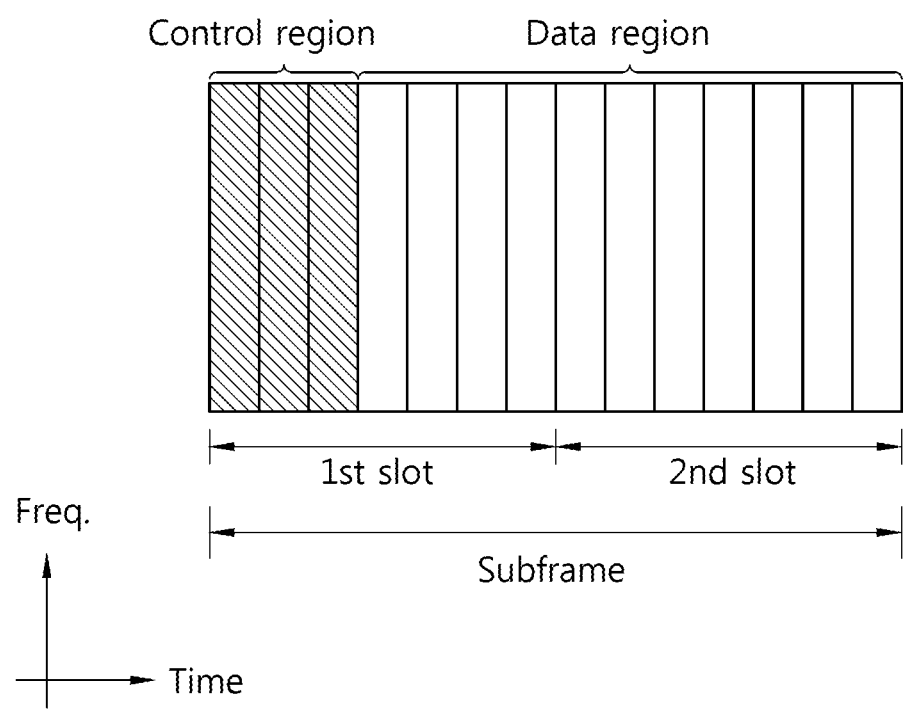
FIG. 4 illustrates a downlink subframe.

FIG. 4 illustrates a downlink subframe.

A downlink (DL) subframe is divided into a control region and a data region in the time domain. The control region includes maximum four previous OFDM symbols of a first slot in the subframe, but the number of OFDM symbols included in the control region may be changed. A physical downlink control channel (PDCCH) and other control channel are allocated to the control region and a PDSCH is allocated to the data region.

As disclosed in the 3GPP TS 36.211 V10.2.0, in 3GPP LTE/LTE-A, a physical control channel includes a physical downlink control channel (PDCCH), a physical control format indicator channel (PCFICH), and a physical hybrid-ARQ indicator channel (PHICH).

The PCFICH transmitted in a first OFDM symbol of the subframe transports a control format indicator (CFI) regarding the number (that is, the size of the control region) of OFDM symbols used to transmit control channels in the subframe. The wireless device first receives the CFI on the PCFICH and thereafter, monitors the PDCCH.

Unlike the PDCCH, the PCFICH is transmitted through a fixed PCFICH resource of the subframe without using blind decoding.

The PHICH transports a positive-acknowledgment (ACK)/negative-acknowledgement (NACK) signal for an uplink (UL) hybrid automatic repeat request (HARQ). An ACK/NACK signal for uplink (UL) data on the PUSCH transmitted by the wireless device is transmitted on the PHICH.

A physical broadcast channel (PBCH) is transmitted in four previous OFDM symbols of a second slot of the first subframe of the radio frame. The PBCH transports system information required for the wireless device to communicate with the base station, and the system information transmitted through the PBCH is called a master information block (MIB). As compared therewith, system information transmitted on the PDSCH instructed by the PDCCH is called a system information block (SIB).

Control information transmitted through the PDCCH is called downlink control information (DCI). The DCI may include resource allocation (also referred to as downlink (DL) grant) of the PDSCH, resource allocation (also referred to as uplink (UL) grant) of the PUSCH, a set of transmission power control commands for individual UEs in a predetermined UE group, and/or activation of a voice over Internet protocol (VoIP).

In 3GPP LTE/LTE-A, transmission of the DL transmission block is performed in a pair of the PDCCH and the PDSCH. Transmission of the DL transmission block is performed in a pair of the PDCCH and the PDSCH. For example, the wireless device receives the DL transmission block on the PDSCH instructed by the PDCCH. The wireless device monitors the PDCCH in the DL subframe to receive the DL resource allocation on the PDCCH. The wireless device receives the DL transmission block on the PDSCH where the DL resource allocation is indicated. Wireless equipment may transmit a UL transport block onto a PUSCH indicated by a UL grant.

The base station determines a PDCCH format according to a DCI to be transmitted to the wireless device and then adds a cyclic redundancy check (CRC) to the DCI, and masks a unique identifier (referred to as a radio network temporary identifier (RNTI)) to the CRC according to an owner or a usage of the PDCCH.

In the case of a PDCCH for a specific wireless device, a unique identifier of the wireless device, for example, a cell-RNTI (C-RNTI) may be masked on the CRC. Alternatively, in the case of a PDCCH for a paging message, a paging indication identifier, for example, a paging-RNTI (P-RNTI) may be masked on the CRC. In the case of a PDCCH for system information, a system information-RNTI (SI-RNTI) may be masked on the CRC. A random access-RNTI (RA-RNTI) may be masked on the CRC in order to indicate the random access response which is a response to transmission of a random access preamble. In order to instruct a transmit power control (TPC) command for a plurality of wireless devices, the TPC-RNTI may be on the CRC. In the PDCCH for semi-persistent scheduling (SPS), the SPS-C-RNTI may be masked on the CRC.

When the C-RNTI is used, the PDCCH transports control information (referred to as UE-specific control information) for the corresponding specific wireless device, and when another RNTI is used, the PDCCH transports common control information which all or a plurality of wireless devices in the cell receive.

Coded data is generated by encoding the DCI added with the CRC. The encoding includes channel encoding and rate matching. The coded data is modulated to generate modulated symbols. The modulated symbols are mapped on a physical RE.

The control region in the subframe includes a plurality of control channel elements (CCEs). The CCE as a logical allocation unit used to provide the coding rate to the PDCCH depending on a state of a radio channel corresponds to a plurality of resource element groups (REGs). The REG includes a plurality of resource elements. A format of the PDCCH and the bit number of available PDCCH are determined according to a correlation of the number of CCEs and the coding rate provided by the CCEs.

One REG includes four REs, and one CCE includes nine REGs. In order to configure one PDCCH, {1, 2, 4, 8} CCEs may be used, and each element of {1, 2, 4, 8} is referred to as a CCE aggregation level.

The number of CCEs used for the transmission of the PDDCH is determined according to a channel state. For example, in the wireless device having a good downlink channel state, one CCE may be used for the transmission of the PDDCH. For example, in the wireless device having a poor downlink channel state, eighth CCEs may be used for the transmission of the PDDCH.

A control channel configured by one or more CCEs performs interleaving of a REG unit, and is mapped on the physical resource after a cyclic shift based on a cell identifier (ID) is performed.

Figure 5:
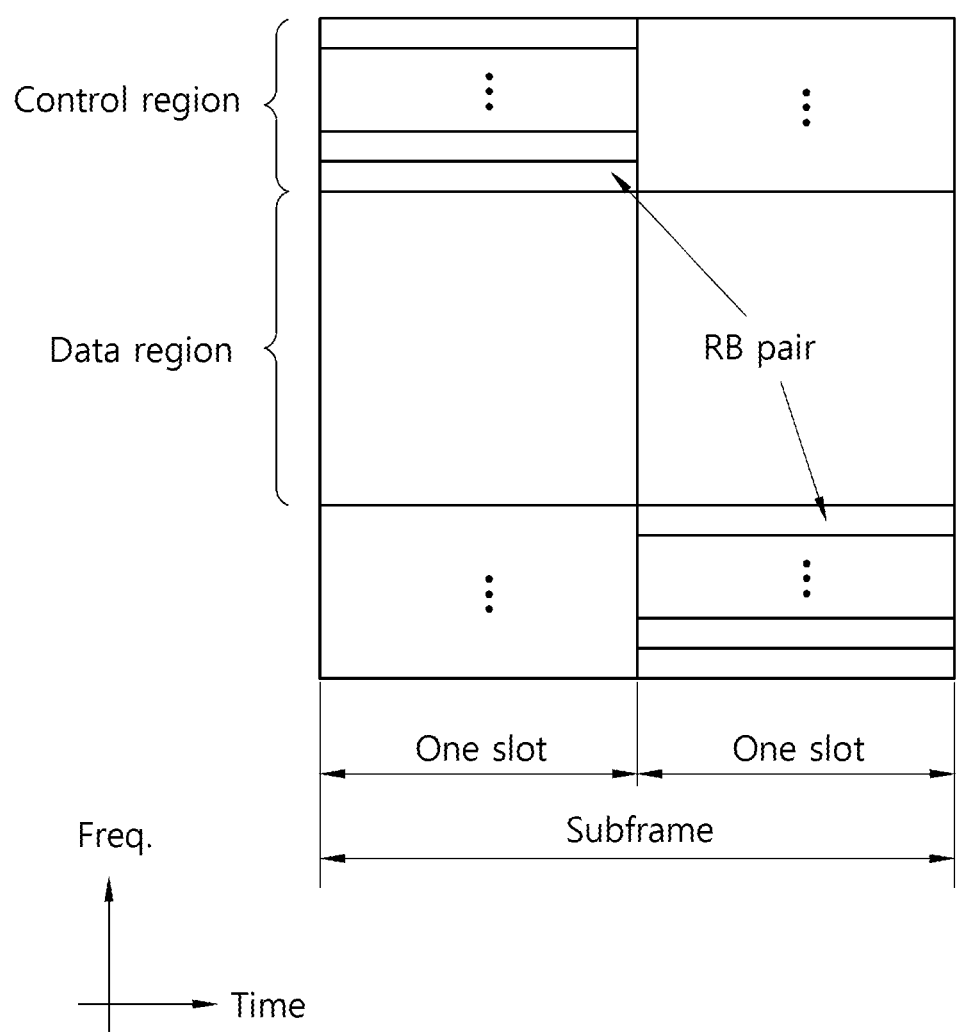
FIG. 5 illustrates a structure of an uplink subframe.

FIG. 5 illustrates a structure of an uplink subframe.

Referring to FIG. 5, an uplink subframe may be divided into a control region and a data region in a frequency domain. A physical uplink control channel (PUCCH) for transmitting uplink control information is allocated to the control region. A physical uplink shared channel (PUSCH) for transmitting data (in some cases, control information may be transmitted together) is allocated to the data region. According to a configuration, the UE may simultaneously transmit the PUCCH and the PUSCH and may transmit only one of the PUCCH and the PUSCH.

A PUCCH for one UE is allocated to a RB pair in the subframe. The RBs that belong to the RB pair occupy different subcarriers in first and second slots, respectively. A frequency occupied by the RBs that belong to the RB pair allocated to the PUCCH is changed based on a slot boundary. This means that the RB pair allocated to the PUCCH is frequency-hopped on the slot boundary. The UE transmits the uplink control information through different subcarriers with time to acquire a frequency diversity gain.

On the PUCCH, a hybrid automatic repeat request (HARQ) acknowledgement (ACK)/non-acknowledgement (NACK), channel state information (CSI) indicating a downlink channel state, for example, a channel quality indicator (CQI), a precoding matrix index (PMI), a precoding type indicator (PTI), a rank indication (RI), and the like may be transmitted.

The CQI provides information on link adaptive parameters which can be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel state as it is, a method of calculating and feed-backing a signal to interference plus noise ratio (SINR), a method of notifying a state which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on a rank (that is, the number of layers) recommended by the UE. That is, the RI represents the number of independent streams used in spatial multiplexing. The RI may be fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is provided in the entire system band, and a frequency-selective RI feedback is not supported.

A PUCCH transports various types of control information according to a format. PUCCH format 1 transports a scheduling request (SR). In this case, an on-off keying (OOK) scheme may be applied. PUCCH format 1a transports an acknowledgement/non-acknowledgment (ACK/NACK) modulated by a binary phase shift keying (BPSK) scheme with respect to one codeword. PUCCH format 1b transports an ACK/NACK modulated by a quadrature phase shift keying (QPSK) scheme with respect to two codewords. PUCCH format 2 transports a channel quality indicator (CQI) modulated by the QPSK scheme. The PUCCH formats 2a and 2b transport the CQI and the ACK/NACK.

The PUCCH formats may be divided according to the modulation scheme and the number of bits in the subframe. Table 2 illustrates a modulation scheme according to the PUCCH format and the number of bits in the subframe.

TABLE 2

| PUCCH format | modulation scheme | bit number per subframe |
|---|---|---|
| 1 | N/A | N/A |
| 1a | BPSK | 1 |
| 1b | QPSK | 2 |
| 2 | QPSK | 20 |
| 2a | QPSK + BPSK | 22 |
| 2b | QPSK + QPSK | 22 |

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence ru(n) is defined by Equation 1 below.

$$r_u(n) = e^{jb(n)\pi/4}$$ [Equation 1]

In Equation 1, u denotes a root index, and n denotes a component index in the range of 0≤n≤N−1, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence r(n, Ics).

$$r(n, I_{cs}) = r(n) \cdot \exp\left(\frac{j2\pi I_{cs} n}{N}\right), 0 \leq I_{cs} \leq N-1$$ [Equation 2]

In Equation 2, $I_{cs}$ denotes a CS index indicating a CS amount (0≤$I_{cs}$≤N−1).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Figure 6:
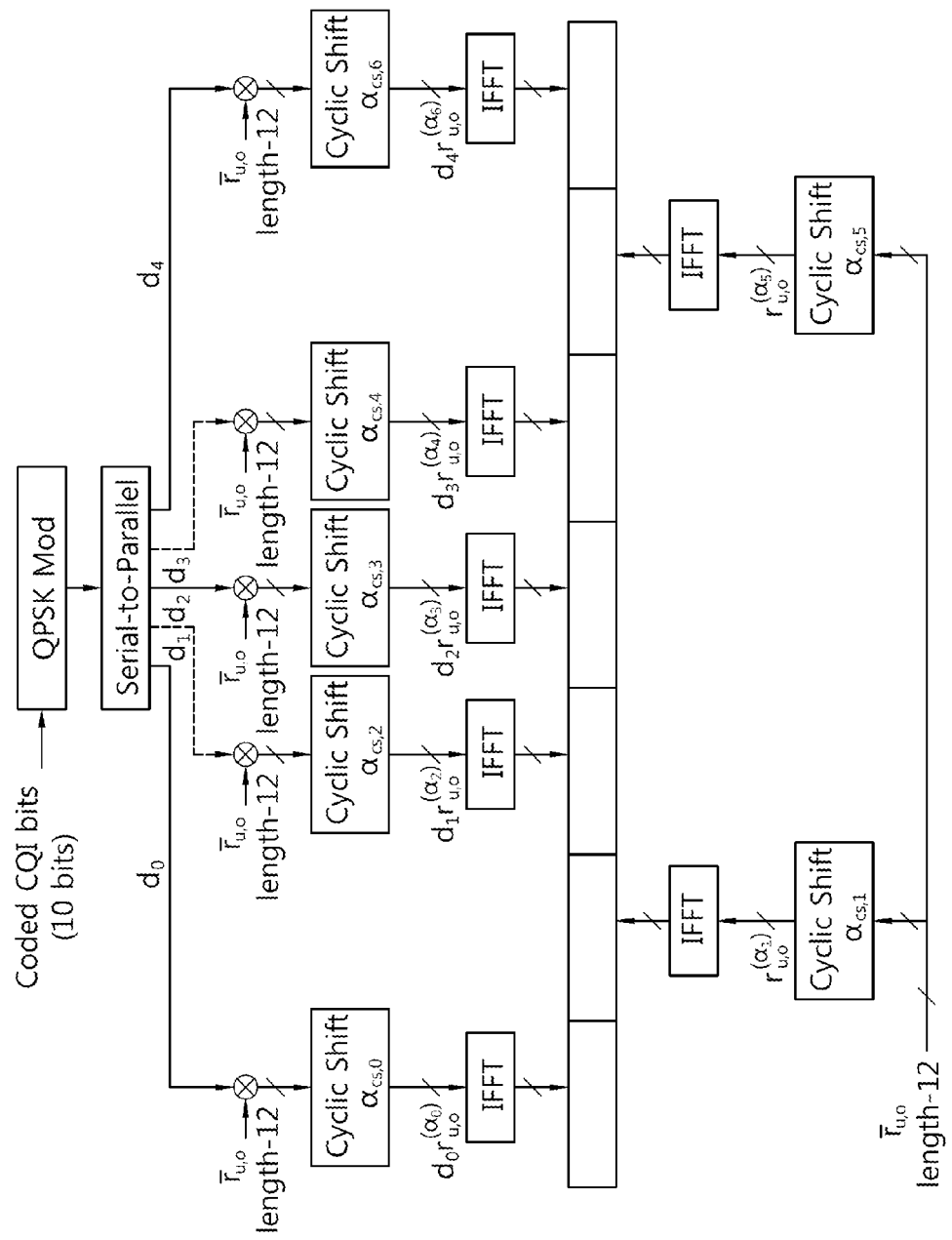
FIG. 6 illustrates a channel structure of a PUCCH format 2/2a/2b for one slot in a normal CP.

FIG. 6 illustrates a channel structure of a PUCCH format 2/2a/2b for one slot in a normal CP. As described above, the PUCCH format 2/2a/2b is used to transmit the CQI.

Referring to FIG. 6, single carrier-frequency division multiple access (SC-FDMA) symbols 1 and 5 are used for a demodulation reference symbol (DM RS) which is an uplink reference signal in the normal CP. In an extended CP, an SC-FDMA symbol 3 is used for the DM RS.

10 CQI information bits are channel-coded at for example, ½ rate to become 20 coded bits. In the channel coding, a reed-muller (RM) code may be used. In addition, the information bits are scrambled (similarly as PUSCH data being scrambled with a gold sequence having a length of 31) and thereafter, mapped with QPSK constellation, and as a result, a QPSK modulation symbol is generated ($d_0$ to $d_4$ in slot 0). Each QPSK modulation symbol is modulated by a cyclic shift of a basic RS sequence having a length of 12 and OFDM-modulated and thereafter, transmitted in each of 10 SC-FDMA symbols in the subframe. 12 periodic shifts uniformly separated from each other allow 12 different user equipments to be orthogonally multiplexed in the same PUCCH resource block. As a DM RS sequence applied to the SC-FDMA symbols 1 and 5, the basic RS sequence having the length of 12 may be used.

Figure 7:
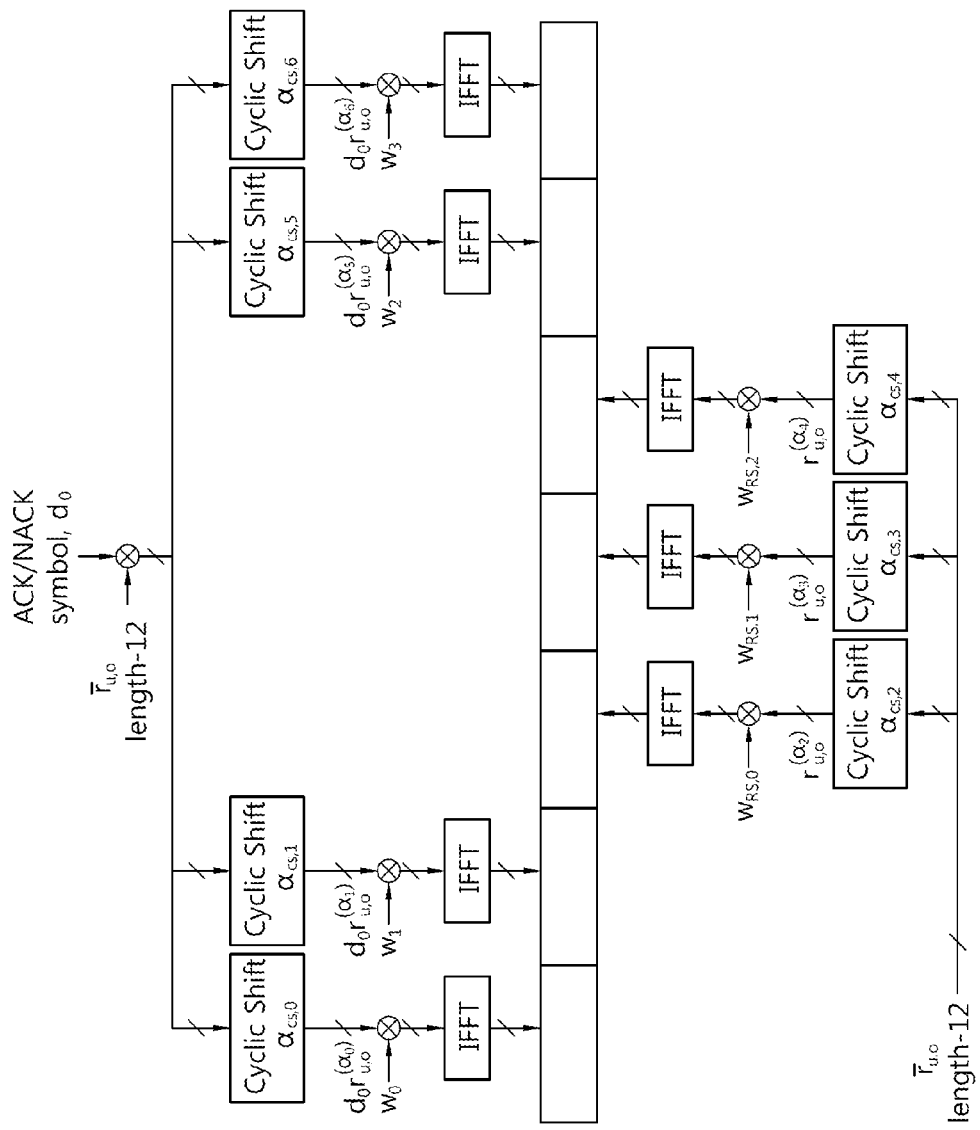
FIG. 7 illustrates a PUCCH format 1a/1b for one slot in the normal CP.

FIG. 7 illustrates a PUCCH format 1a/1b for one slot in the normal CP. An uplink reference signal is transmitted from third to fifth SC-FDMA symbols. In FIG. 7, $w_0$, $w_1$, $w_2$, and $w_3$ may be modulated in the time domain after inverse fast Fourier transform (IFFT) modulation or modulated in the frequency domain before the IFFT modulation.

One slot includes 7 OFDM symbols. Three OFDM symbols are used as reference signal (RS) OFDM symbols for a reference signal. Four OFDM symbols are used as data OFDM symbols for an ACK/NACK signal.

In the PUCCH format 1b, a modulation symbol d(0) is generated by modulating a 2-bit ACK/NACK signal based on quadrature phase shift keying (QPSK).

A CS index Ics may vary depending on a slot number ns in a radio frame and/or a symbol index 1 in a slot.

In the normal CP, there are four data OFDM symbols for transmission of an ACK/NACK signal in one slot. It is assumed that CS indices mapped to the respective data OFDM symbols are denoted by $I_{cs0}$, $I_{cs1}$, $I_{cs2}$, and $I_{cs3}$.

The modulation symbol d(0) is spread to a cyclically shifted sequence $r(n, I_{cs})$. When a one-dimensionally spread sequence mapped to an (i+1)th OFDM symbol in a subframe is denoted by m(i), it can be expressed as follows.

$$\{m(0), m(1), m(2), m(3)\} = \{d(0)r(n, I_{cs0}), d(0)r(n, I_{cs1}), d(0)r(n, I_{cs2}), d(0)r(n, I_{cs3})\}$$

In order to increase UE capacity, the one-dimensionally spread sequence can be spread by using an orthogonal sequence. An orthogonal sequence $w_i(k)$ (where i is a sequence index, 0≤k≤K−1) having a spreading factor K=4 uses the following sequence.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spreading factor K=3 uses the following sequence.

TABLE 4

| Index (i) | $[w_i(0), w_i(1), w_i(2)]$ |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used for each slot.

Therefore, when any orthogonal sequence index i is given, a two-dimensionally spread sequences {s(0), s(1), s(2), s(3)} can be expressed as follows.

$$\{s(0),s(1),s(2),s(3)\}=\{w_i(0)m(0),w_i(1)m(1),w_i(2)m(2), w_i(3)m(3)\}$$

The two-dimensionally spread sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal for the PUCCH format 1b is also transmitted by cyclically shifting the base sequence r(n) and then by spreading it by the use of an orthogonal sequence. When CS indices mapped to three RS OFDM symbols are denoted by $I_{cs4}$, $I_{cs5}$, and $I_{cs6}$, three cyclically shifted sequences $r(n,I_{cs4})$, $r(n,I_{cs5})$, and $r(n,I_{cs6})$ can be obtained. The three cyclically shifted sequences are spread by the use of an orthogonal sequence $w_{RS,i}(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed with one resource block.

In the 3GPP LTE, a resource index $n^{(1)}_{PUCCH}$ is defined in order for the UE to obtain the three parameters for configuring the PUCCH. The resource index $n^{(1)}_{PUCCH}$ is defined to $n_{CCE}+N^{(1)}_{PUCCH}$, where $n_{CCE}$ is an index of a first CCE used for transmission of corresponding DCI (i.e., DL resource allocation used to receive DL data mapped to an ACK/NACK signal), and $N^{(1)}_{PUCCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index $I_{cs}$, a resource block index m, and an index for obtaining the three indices. The ACK/NACK resource may include at least one of an orthogonal sequence, a cyclic shift, a resource block, and a combination thereof.

Meanwhile, in LTE-A, a PUCCH format 3 is introduced in order to transmit the UL control information (for example, the ACK/NACK and the SR) of a maximum of 21 bits (represent the bit number before channel coding as information bits and a maximum of 22 bits when the SR is included). The PUCCH format 3 uses the QPSK as the modulation scheme, and a bit number which is transmittable in the subframe is 48 bits (representing a bit number transmitted after the information bits are channel-coded).

The PUCCH format 3 performs block spreading based transmission. That is, a modulated symbol sequence that modulates a multi-bit ACK/NACK by using a block spreading code is spread and thereafter, transmitted in the time domain.

Figure 8:
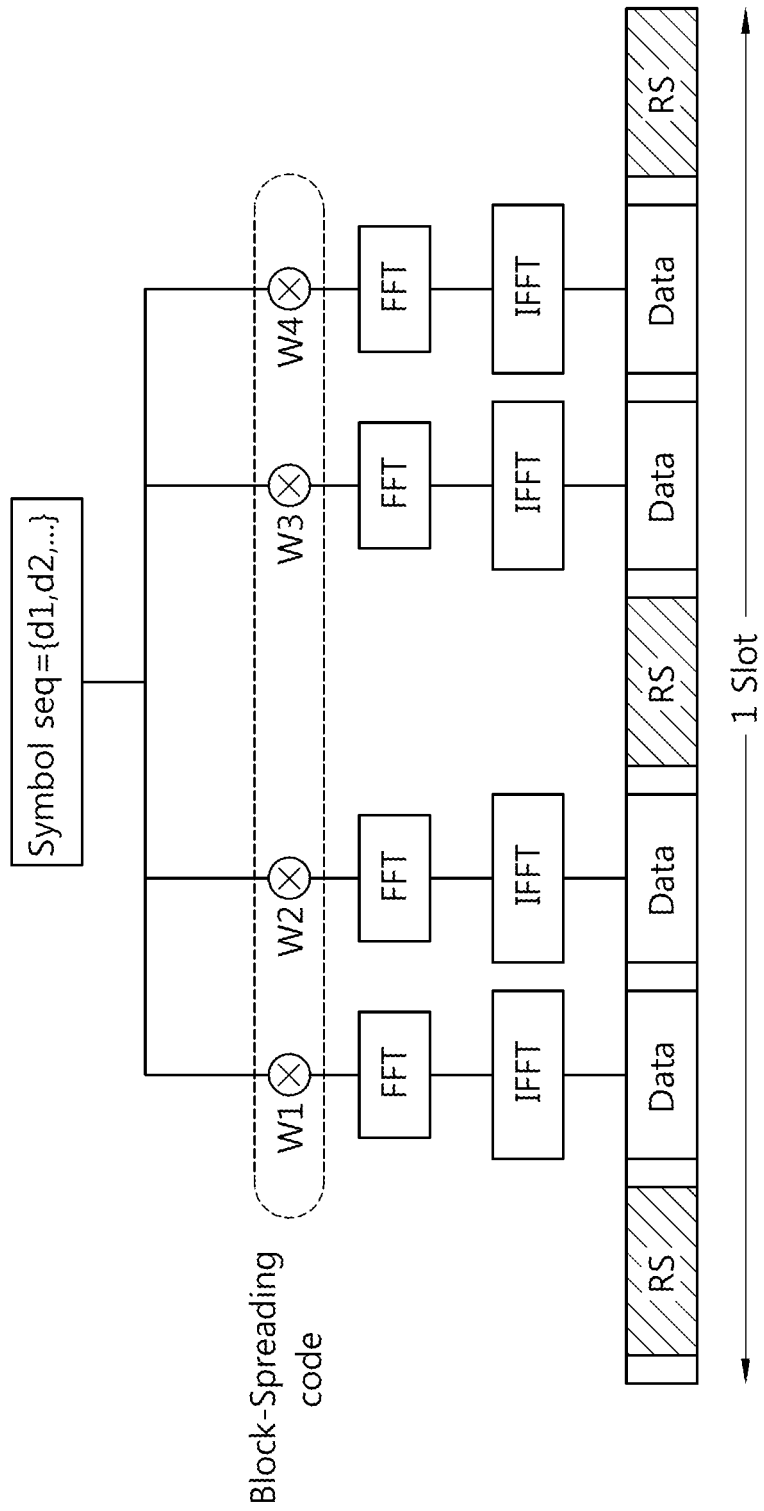
FIG. 8 exemplifies a channel structure of the PUCCH format 3.

FIG. 8 exemplifies a channel structure of the PUCCH format 3.

Referring to FIG. 8, a modulated symbol sequence {d1, d2, . . . } is spread in the time domain by applying the block spreading code. The block spreading code may be an orthogonal cover code (OCC). Herein, the modulated symbol sequence may be a sequence of the modulated symbols in which the ACK/NACK information bits which are multiple bits are channel-coded (using the RM code, a TBCC, a punctured RM code, and the like) to generate ACK/NACK coded bits, and may be a sequence of modulated symbols in which the ACK/NACK coded bits are modulated (for example, QPSK-modulated). The sequence of the modulated symbols is mapped in data symbols of the slot through fast Fourier transform (FFT) and inverse fast Fourier transform (IFFT) and thereafter, transmitted. FIG. 8 exemplifies the case in which three RS symbols exist in one slot, but two RS symbols may exist and in this case, a block spreading code having a length of 5 may be used.

[Semi-Persistent Scheduling (SPS)]

The UE in the wireless communication system receives scheduling information such as the DL grant and the UL grant through the PDCCH, and the UE performs an operation of receiving the PDSCH and the transmitting the PUSCH based on the scheduling information. Generally, the DL grant and the PDSCH are received in the same subframe. In addition, in the case of the FDD, the PUSCH is transmitted after four subframes from the subframe receiving the UL grant. The LTE provides semi-persistent scheduling (SPS) in addition to the dynamic scheduling.

The downlink or uplink SPS may notify that semi-persistent transmission (PUSCH)/reception (PDSCH) from/to the UE is performed in any subframes through an higher layer signal such as radio resource control (RRC). Parameters provided to the higher layer signal may be, for example, a period and an offset value of the subframe.

When the UE receives activation and release signals of the SPS transmission through the PDCCH after recognizing the SPS transmission/reception through the RRC signaling, the SPS transmission/reception is performed or released. That is, even though the UE receives the SPS through the RRC signaling, when the SPS transmission/reception is not directly performed and the activation or release signal is received through the PDCCH, the SPS transmission/reception is performed in the subframe corresponding to the subframe period and the offset value received through the RRC signaling by applying a frequency resource (resource block) according to the resource block allocation assigned in the PDCCH, modulation according to MCS information, and the coding rate. When the release signal is received through the PDCCH, the SPS transmission/reception stops. When the PDCCH (SPS reactivation PDCCH) including the activation signal is received again, the stopped SPS transmission/reception restarts by using the frequency resource assigned in the corresponding PDCCH, the MCS, and the like.

Hereinafter, a PDCCH for SPS activation is referred to as an SPS activation PDCCH, and a PDCCH for SPS release is referred to as an SPS release PDCCH. The UE may validate whether the PDCCH is the SPS activation/release PDCCH in the case of satisfying the following conditions. 1. CRS parity bits obtained from the PDCCH payload are scrambled to the SPS C-RNTI, and 2. A value of a new data indicator field needs to be '0'. Further, each field value included in the PDCCH is set as values of the following table, the UE receives the downlink control information (DCI) of the corresponding PDCCH as the SPS activation or release.

TABLE 5

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 illustrates field values of the SPS activation PDCCH for validating the SPS activation.

TABLE 6

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 6 illustrates field values of the SPS release PDCCH for validating the SPS release.

By the SPS, a PDSCH transmitted in the same subframe as the PDCCH instructing SPS activation has the corresponding PDCCH, but a subsequent PDSCH, that is, a PDSCH which is subsequently scheduled by the SPS (this is assumed as an SPS PDSCH) has no corresponding PDCCH. Accordingly, when transmitting an ACK/NACK for the SPS PDSCH, it is impossible to use the PUCCH resource mapped in the lowest CCE index of the PDCCH. Therefore, after predetermine a plurality of resources through an higher layer signal such as an RRC message, the base station may indicate a ACK/NACK transmission resource for the SPS PDSCH by a method of indicating a specific resource among the plurality of resources by converting a TPC field included in the PDCCH indicating the SPS activation into an ACK/NACK resource indicator (ARI).

<HARQ(Hybrid Automatic Repeat Request)>

When the frame is not received or damaged upon the transmission and reception of the data between the base station and the user equipment, as an error control method, there are an automatic repeat request (ARQ) and a hybrid ARQ (HARQ) which is a more developed form. In the ARQ method, an acknowledgement (ACK) message waits to go after transmitting one frame, a receiving side transmits the ACK message only when receiving one frame well, but transmits a negative-ACK(NACK) message when an error occurs in the frame, and a receiving-side buffer deletes the information of the received frame with the error. The transmitting side transmits a subsequent frame when receiving the ACK signal, but re-transmits the frame when receiving the NACK message.

Unlike the ARQ method, in the HARQ method, when the received frame may not be demodulated, the receiving terminal transmits the NACK message to the transmitting terminal, but a pre-received frame is stored in the buffer for a predetermined time, and when the frame is re-transmitted, the frame is combined with the pre-received frame, thereby enhancing a reception success rate.

Recently, the HARQ method which is more efficient than the ARQ method has been widely used. The HARQ method has various types, and largely, may be divided into a synchronous HARQ and an asynchronous HARQ according to a retransmitting timing, and may be divided into a channel-adaptive method and a channel-non-adaptive method according to whether a channel state is reflected to an amount of the resources used in the retransmission.

Figure 9:
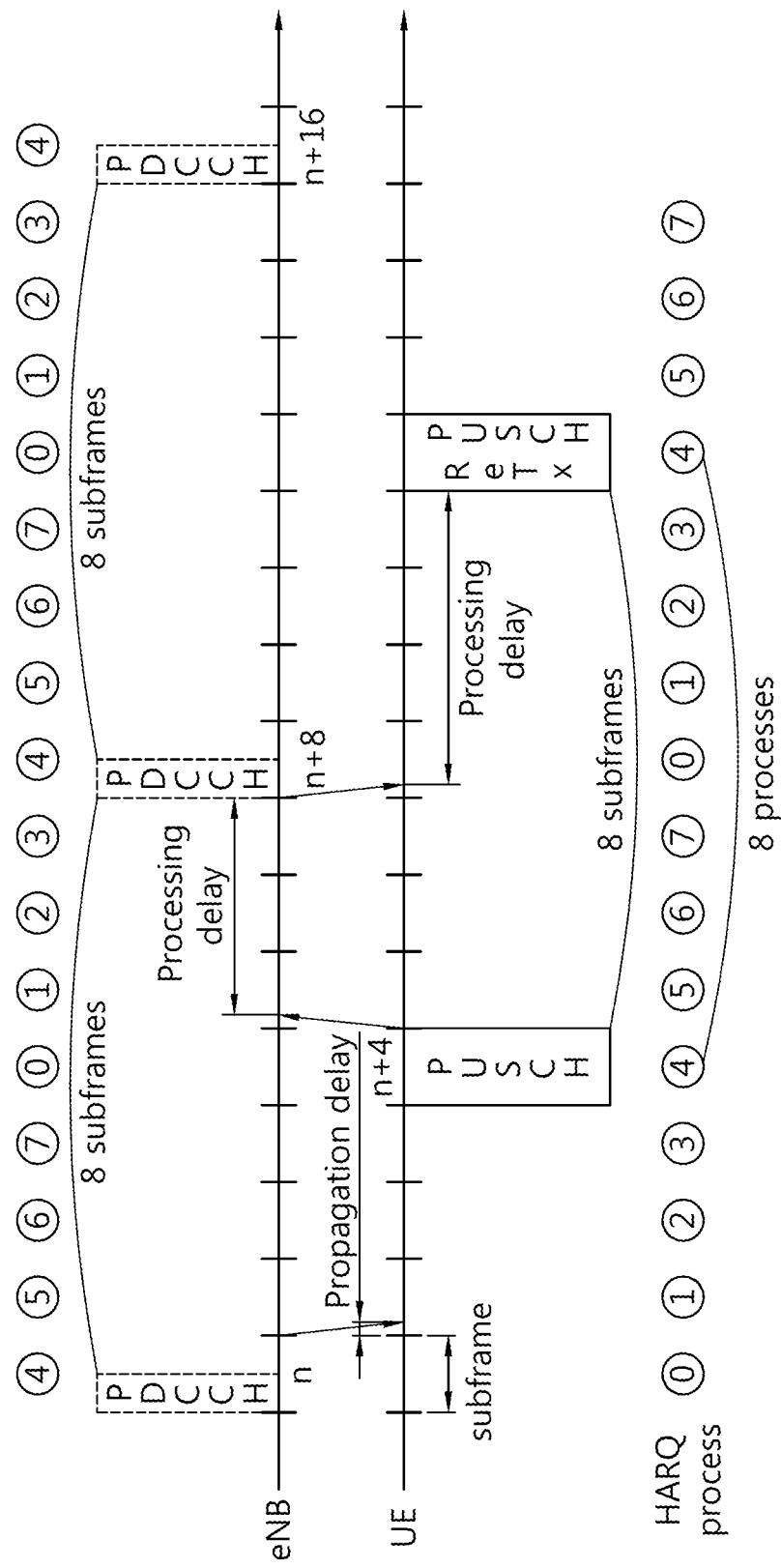
FIG. 9 exemplifies the synchronous HARQ.

FIG. 9 exemplifies the synchronous HARQ.

The synchronous HARQ method is a method in which a subsequent retransmission is achieved at a timing defined by the system when initial transmission is failed. That is, when it is assumed that the timing when the retransmission is performed is achieved every eighth time unit (subframe) after the initial transmission, because this is pre-defined between the base station and the user equipment, the timing needs not to be additionally notified. However, when the data transmitting side receives the NACK message, the data transmitting side retransmits the data every eighth time unit until receiving the ACK message.

On the other hand, the asynchronous HARQ method may be performed by newly scheduling the retransmission timing or by additionally signaling. The timing of the retransmission for the data of which the transmission is previously failed varies by various factors such as a channel state and the like.

The channel-adaptive HARQ method is a method in which modulation of the data upon the retransmission, the number of resource blocks, the coding schemes, and the like are made as provided in the initial transmission, and unlike this, the channel-non-adaptive HARQ method is a method in which the modulation of the data upon the retransmission, the number of resource blocks, the coding schemes, and the like vary according to the channel state.

For example, the channel-non-adaptive HARQ method is a method in which the transmitting side transmits the data by using six resource blocks in the initial transmission and retransmits the data by using six resource blocks equally even in the subsequent retransmission.

On the contrary, the channel-adaptive HARQ method is a method in which the transmitting side initially transmits the data by using six resource blocks and thereafter, retransmits the data by using resource blocks having the number which is larger or smaller than six according to the channel state.

Four HARQ combinations may be performed by the classification, but as the mainly used HARQ methods, there are the asynchronous and channel-adaptive HARQ methods and the synchronous and channel-non-adaptive HARQ methods. The asynchronous and channel-adaptive HARQ methods may maximize the retransmission efficiency by adaptively varying a retransmission timing and an amount of the used resource according to the channel state, but are not generally considered for the uplink because there is a disadvantage that an overhead is increased. Meanwhile, the synchronous and channel-non-adaptive HARQ methods are advantageous in that there is little overhead for the because the timing and the resource assignment for retransmission are committed in the system, but when the synchronous and channel-non-adaptive HARQ methods are used in a channel state having a severe change, it is disadvantageous that the retransmission efficiency is very low.

Currently, in 3GPP LTE, in the case of a downlink, the asynchronous HARQ method has been used, and in the case of the uplink, the synchronous HARQ method has been used.

Meanwhile, as an example of the downlink, until the data is scheduled and transmitted and then the ACK/NACK signal is received from the user equipment and the next data is transmitted again, a time delay occurs as illustrated in FIG. 9. This is a propagation delay of the channel and a delay occurring due to a time required for data decoding and data coding. For data transmission without a blank for the delay period, a method of transmitting the data by using an independent HARQ process has been used.

For example, when a shortest period from the next data transmission to the next data transmission is eight sub-frames, the data may be transmitted without the blank by providing eight independent processes. In LTE FDD, in the case of not operating in the MIMO, a maximum of eight HARQ processes may be assigned.

[Carrier Aggregation]

Hereinafter, a carrier aggregation system will be described.

Figure 10:
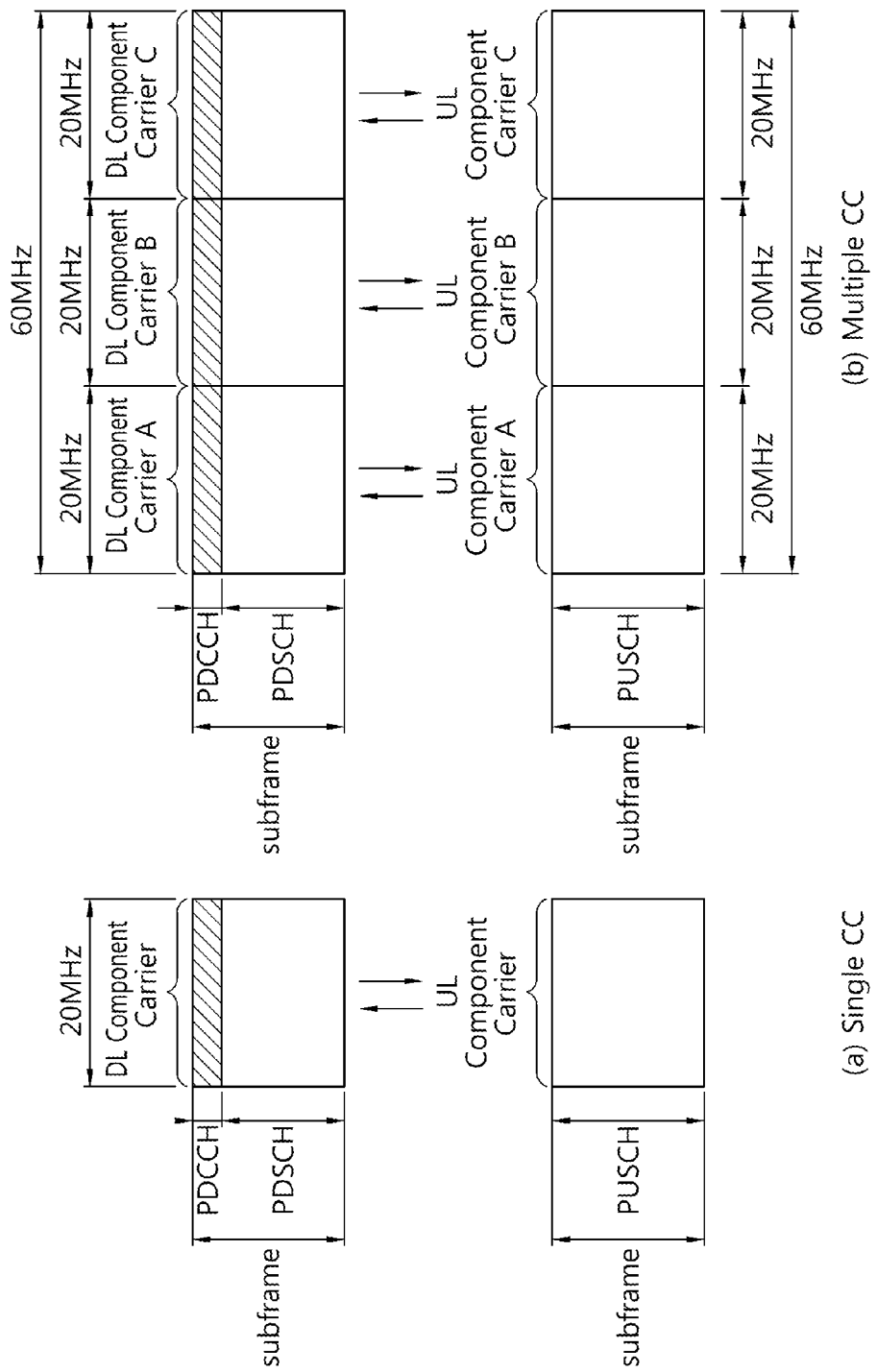
FIG. 10 illustrates a comparative example of a single carrier system in the related art and a carrier aggregation system.

FIG. 10 illustrates a comparative example of a single carrier system in the related art and a carrier aggregation system.

Referring to FIG. 10, in the single carrier system, only one carrier is supported to the UE in the uplink and the downlink. A bandwidth of the carrier may be various, but the number of carriers allocated to the UE is one. On the contrary, in the carrier aggregation (CA) system, a plurality of component carriers DL CCs A to C and UL CCs A to C may be allocated to the UE. A component carrier (CC) means a carrier used in the CA system and may be abbreviated as a carrier. For example, in order to allocate a bandwidth of 60 MHz to the UE, three 20-MHz component carriers may be allocated.

The CA system may be divided into a contiguous CA system in which aggregated carriers are contiguous and a non-contiguous CA system in which the aggregated carriers are separated from each other. Hereinafter, when simply referred to as the CA system, it should be understood that the CA system includes both the system in which the component carriers are contiguous and the system in which the component carriers are not contiguous.

Component carriers to be targeted when one or more component carriers are aggregated may use a bandwidth used in the existing system for backward compatibility with the existing system as it is. For example, in a 3GPP LTE system, bandwidths of 1.4 MHz, 3 MHz, 5 MHz, 10 MHz, 15 MHz, and 20 MHz are supported, and in a 3GPP LTE-A system, a wideband of 20 MHz or more may be configured by using only the bandwidth of the 3GPP LTE system. Alternatively, the wideband may be configured by defining a new bandwidth without using the bandwidth of the existing system as it is.

A system frequency band of the wireless communication system is divided into a plurality of carrier-frequencies. Here, the carrier-frequency means a center frequency of a cell. Hereinafter, the cell may mean a downlink frequency resource and an uplink frequency resource. Further, the cell may mean a combination of the downlink frequency resource and an optional uplink frequency resource. Further, in general, when the carrier aggregation (CA) is not considered, the uplink and downlink frequency resources may continuously exist as a pair in one cell.

In order to transmit and receive packet data through a specific cell, the UE should first complete a configuration for the specific cell. Herein, the configuration means a state in which the reception of the system information required to transmit and receive the data in the corresponding cell is completed. For example, the configuration may include a whole process of receiving common physical layer parameters required to transmit and receive the data, media access control (MAC) layer parameters, or parameters required for a specific operation in an RRC layer. The configured cell is in a state where transmission and reception of the packet are enabled immediately after only information that the packet data may be transmitted is received.

The configured cell may exist in an activation or deactivation state. Here, the activation means that the data is transmitted or received or in a ready state. The UE may monitor or receive a control channel PDCCH and a data channel PDSCH of the activated cell in order to verify a self-allocated resource (frequency, time, and the like).

The deactivation means that transmission or reception of the traffic data is impossible, and measurement or transmission/reception of minimum information is possible. The UE may receive system information (SI) required to receive the packet from the deactivated cell. On the other hand, the UE does not monitor or receive a control channel PDCCH and a data channel PDSCH of the deactivated cell in order to verify the self-allocated resource (frequency, time, and the like).

The cell may be divided into a primary cell, a secondary cell, and a serving cell.

The primary cell means a cell that operates at a primary frequency, and means a cell in which the UE performs an initial connection establishment procedure or a connection reestablishment procedure with the base station, or a cell indicated as the primary cell during a handover procedure.

The secondary cell means a cell that operates at a secondary frequency, and once RRC connection is established, the secondary cell is configured and used to provide an additional radio resource.

The serving cell is configured as the primary cell in the case of an UE in which the CA is not configured or the CA cannot be provided. In the case where the carrier aggregation is configured, the term of the serving cell represents a cell configured to the UE and a plurality of serving cells may be constituted. One serving cell may be configured by a pair of one downlink component carrier or a pair of {downlink component carrier, uplink component carrier}. The plurality of serving cells may be configured by a set of the primary cell and one or a plurality of secondary cells.

A primary component carrier (PCC) means a component carrier (CC) corresponding to the primary cell. The PCC is a CC in which the UE is early connected or RRC-connected with the BS, among many CCs. The PCC is a specific CC that performs connection or RRC-connection for signaling with respect to a plurality of CCs and manages UE context information which is connection information associated with the UE. Further, the PCC is connected with the UE and continuously exists in the activation state in the case of an RRC connected mode. A downlink component carrier corresponding to the primary cell is referred to as a downlink primary component carrier (DL PCC), and an uplink component carrier corresponding to the primary cell is referred to as an uplink primary component carrier (UL PCC).

A secondary component carrier (SCC) means a CC corresponding to the secondary cell. That is, the SCC, as a CC allocated to the UE in addition to the PCC, is an extended carrier for additional resource allocation and the like of the UE in addition to the PCC, and may be divided into activation and deactivation states. A downlink component carrier corresponding to the secondary cell is referred to as a DL secondary CC (DL SCC), and an uplink component carrier corresponding to the secondary cell is referred to as an UL secondary CC (UL SCC).

The primary cell and the secondary cell have the following features.

First, the primary cell is used for transmission of the PUCCH. Second, the primary cell is continuously activated, while the secondary cell is a carrier activated/deactivated according to a specific condition. Third, when the primary cell experiences a radio link failure (hereinafter referred to as an RLF), the RRC-reconnection is triggered. Fourth, the primary cell may be changed by a security key or a handover procedure accompanied with a random access channel (RACH) procedure. Fifth, non-access stratum (NAS) information is received through the primary cell. Sixth, in the FDD system, the primary cell is always constituted by a pair of the DL PCC and the UL PCC. Seventh, a different component carrier (CC) for each UE may be configured as the primary cell. Eighth, the primary cell may be replaced only through handover, cell selection/cell reselection processes. In the addition of a new secondary cell, RRC signaling to transmit system information of a dedicated secondary cell may be used.

In the component carrier constituting the serving cell, the downlink component carrier may constitute one serving cell, and the downlink component carrier and the uplink component carrier are connection-configured to constitute one serving cell. However, the serving cell is not constituted by only one uplink component carrier.

Activation/deactivation of the component carrier is equivalent to, that is, a concept of activation/deactivation of the serving cell. For example, assumed that serving cell 1 is constituted by DL CC1, activation of serving cell 1 means activation of DL CC1. Assumed that serving cell 2 is constituted by connection-configuring DL CC2 and UL CC2, activation of serving cell 2 means activation of DL CC2 and UL CC2. In the meantime, each component carrier may correspond to the serving cell.

The number of component carriers aggregated between the downlink and the uplink may be differently set. A case in which the number of downlink CCs and the number of uplink CCs are the same as each other is referred to as symmetric aggregation, and a case in which the numbers are different from each other is referred to as asymmetric aggregation. Further, sizes (that is, bandwidths) of the CCs may be different from each other. For example, when it is assumed that five CCs are used to configure a 70 MHz-band, the five CCs may be constituted by a 5 MHz CC (carrier #0), a 20 MHz CC (carrier #1), a 20 MHz CC (carrier #2), a 20 MHz CC (carrier #3), and a 5 MHz CC (carrier #4).

As described above, the CA system may support a plurality of component carriers (CCs), that is, a plurality of serving cells, unlike the single carrier system.

The CA system may support cross-carrier scheduling. The cross-carrier scheduling may be a scheduling method that may perform resource allocation of the PDSCH transmitted through other component carriers through the PDCCH transmitted through a specific component carrier and/or resource allocation of the PUSCH transmitted through other component carriers in addition to the component carrier which is basically linked with the specific component carrier. That is, the PDCCH and the PDSCH may be transmitted through different DL CCs, and the PUSCH may be transmitted through another UL CC which is not the UL CC linked with the DL CC transmitted by the PDCCH including a UL grant. As such, in the system supporting the cross-carrier scheduling, a carrier indicator indicating that the PDCCH notifies that the PDSCH/PUSCH providing control information is transmitted through any DL CC/UL CC. A field including the carrier indicator may be hereinafter called a carrier indication field (CIF).

The CA system supporting the cross-carrier scheduling may include a carrier indication field (CIF) in an existing downlink control information (DCI) format. In the system supporting the cross-carrier scheduling, for example, the LTE-A system, since the CIF is added to the existing DCI format (that is, the DCI format used in the LTE), 3 bits may be extended, and the PDCCH structure may reuse an existing coding method, a resource allocating method (that is, resource mapping based on the CCE), and the like.

The BS may configure a PDCCH monitoring DL CC (monitoring CC) set. The PDCCH monitoring DL CC set is configured by some DL CCs among all the aggregated DL CCs, and when the cross-carrier scheduling is configured, the UE may perform PDCCH monitoring/decoding with respect to only the DL CC included in the PDCCH monitoring DL CC set. In other words, the BS transmits the PDCCH for the PDSCH/PUSCH to be scheduled through only the DL CC included in the PDCCH monitoring DL CC set. The PDCCH monitoring DL CC set may be set UE-specifically, UE group-specifically, or cell-specifically.

Hereinafter, in 3GPP LTE, ACK/NACK transmission for the HARQ will be described.

In FDD, the user equipment for supporting aggregation for a maximum of two serving cells transmits the ACK/NACK by using the PUCCH format 1b using channel selection when two serving cells are configured.

The user equipment for supporting aggregation for two or more serving cells transmits the ACK/NACK by using the PUCCH format 1b or the PUCCH format 3 using the channel selection according to a configuration of the higher layer signal when two or more serving cells are configured. The channel selection will be described below.

A UL subframe and a DL subframe coexist in one radio frame in the TDD, unlike in frequency division duplex (FDD). In general, the number of UL subframes is less than the number of DL subframes. Therefore, in preparation for a case in which the UL subframes for transmitting an ACK/NACK signal are insufficient, it is supported that a plurality of ACK/NACK signals for a plurality of DL transport blocks are transmitted in one UL subframe.

Two ACK/NACK modes, i.e., channel selection and bundling, are supported according to a higher layer configuration for a UE which does not support an aggregation of 2 or more than 2 serving cells in TDD.

First, the bundling is an operation in which, if all of PDSCHs (i.e., DL transport blocks) received by a UE are successfully decoded, ACK is transmitted, and otherwise NACK is transmitted. This is called an AND operation. However, the bundling is not limited to the AND operation, and may include various operations for compressing ACK/NACK bits corresponding to a plurality of transport blocks (or codewords). For example, the bundling may indicate a counter value indicating the number of ACKs (or NACKs) or the number of consecutive ACKs.

Second, the channel selection is also called ACK/NACK multiplexing. The UE transmits the ACK/NACK by selecting one of a plurality of PUCCH resources.

Table 5 below shows a DL subframe n-k associated with a UL subframe n depending on the UL-DL configuration in 3GPP LTE. Herein, k∈K, where M is the number of elements of a set K.

TABLE 7

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Assume that M DL subframes are associated with a UL subframe n, where M=3. Since 3 PDCCHs can be received from 3 DL subframes, the UE can acquire 3 PUCCH resources $n^{(1)}_{PUCCH,0}$, $n^{(1)}_{PUCCH,1}$, $n^{(1)}_{PUCCH,2}$. An example of channel selection is shown in Table 6 below.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or a corresponding PDCCH cannot be detected. In Table 6 above, there are three PUCCH resources $n^{(1)}_{PUCCH,0}$, $n^{(1)}_{PUCCH,1}$, and $n^{(1)}_{PUCCH,2}$, and b(0) and b(1) are 2 bits transmitted by using a selected PUCCH.

For example, if the UE successfully receives three DL transport blocks in three DL subframes, the UE transmits bits (1,1) through the PUCCH by using $n^{(1)}_{PUCCH,2}$. If the UE fails to decode the DL transport block and successfully decodes the remaining transport blocks in a $1^{st}$ (i=0) DL subframe, the UE transmits bits (0, 1) through the PUCCH by using $n^{(1)}_{PUCCH,2}$.

In channel selection, NACK and DTX are coupled if at least one ACK exists. This is because a combination of a reserved PUCCH resource and a QPSK symbol is not enough to express all ACK/NACK states. However, if the ACK does not exist, the DTX and the NACK are decoupled.

The existing PUCCH format 1b may transmit only the ACK/NACK of 2 bits. However, the PUCCH format 1b using the channel selection represents more ACK/NACK states by linking a combination of the assigned PUCCH resources and the modulation symbol (2 bits) with a state of a plurality of ACK/NACKs.

In TDD, when UL-DL configuration is 5 and the user equipment does not support aggregation of two or more serving cells, only bundling is supported.

In TDD, in the case of the user equipment supporting the aggregation of two or more serving cells, when two or more serving cells are configured, the user equipment transmits the ACK/NACK by using one of the PUCCH format 1b with channel selection or the PUCCH format 3 according to the upper layer configuration.

In TDD, the user equipment supporting the aggregation of two or more serving cells is configured by the higher layer signal so as to use the bundling and transmits the ACK/NACK by using one of the PUCCH format 1b with channel selection or the PUCCH format 3 according to the upper layer configuration even when one serving cell is configured.

Even in FDD, a table similar to Table 8 is defined and the ACK/NACK may be transmitted according to the table.

Hereinafter, the present invention will be described.

In a future wireless communication system, machine type communication (MTC), carrier aggregation using different TDD UL-DL configurations, and the like may be used. As a result, various types of services may be provided and an increase in the number of user equipments simultaneously scheduled is expected. Accordingly, it is difficult to perform smooth scheduling on an exiting control channel scheduling the data channel.

In LTE, a control channel transmitting control information is a PDCCH. In order to solve a resource shortage phenomenon of the PDCCH, bundled scheduling for scheduling the PDSCH transmitted through a plurality of subframes or a plurality of CCs through one PDCCH, cross-subframe scheduling for flexibility of PUCCH application, and the like have been considered. Further, unlike the existing PDCCH, introduction of an enhanced-PDCCH (e-PDCCH) configuring the control channel in the PDSCH region has been also considered.

Meanwhile, in order to transmit the ACK/NACK which is the acknowledgement for the data channel scheduled through the control channel, a transmit diversity may be used. The transmit diversity means a technique of transmitting the same information through different antenna ports. One type of transmit diversity includes a spatially orthogonal resource transmit diversity (SORTD). The SORTD is a transmit diversity technique of simultaneously transmitting the same signal by using spatially orthogonal resources.

In the case of LTE, the ACK/NACK for the PDSCH may be transmitted through the PUCCH format 1a/1b. In this case, the ACK/NACK is transmitted after a minimum of preparation time by considering propagation delay of the user equipment/base station receiving the data, a processing time required for processing of control information/data reception, and the like. The minimum of preparation time is represented by a subframe unit to become a $k_m$ (for example, 4) subframe.

In FDD, the ACK/NACK for the data is transmitted after 4 subframes from the subframe receiving the data. In the case of TDD, an ACK/NACK transmission time is defined by considering a ratio of the number of DL subframes in the radio frame to the number of UL subframes so that the ACK/NACK transmission is not concentrated in a specific UL subframe.

The following table represents a time relationship of transmitting the ACK/NACKs for the plurality of DL subframes corresponding to one UL subframe (Table 9 is the same as Table 7, but represented again for convenience).

TABLE 9

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 9 represents that subframe 2 of UL-DL configuration 0 is the UL subframe and the ACK/NACK for the data received in the DL subframe before 6 subframes is transmitted in the subframe 2. In each UL subframe, a plurality of ACK/NACKs may be transmitted by using ACK/NACK bundling and ACK/NACK multiplexing.

Meanwhile, the ACK/NACK includes an ACK/NACK for the PDSCH scheduled by the PDCCH and an ACK/NACK for the PDCCH itself. The ACK/NACK for the PDCCH itself may be, for example, an ACK/NACK for a DL SPS release PDCCH. A PDCCH resource used in the ACK/NACK transmission may be implicitly determined as a resource corresponding to the PDCCH. That is, a resource linked with the lowest CCE index among the CCEs configuring the PDCCH may be a PUCCH resource transmitting the ACK/NACK.

The implicit PUCCH resource described above is defined only by corresponding to 1) the UL subframe after 4 subframes in the DL subframe in FDD and 2) a DL subframe-UL subframe of Table 9 in TDD.

Meanwhile, in the ACK/NACK, an ACK/NACK for the PDSCH scheduled without the PDCCH may be included. For example, this case is the ACK/NACK for the PDSCH by the SPS. In this case, since the PDCCH corresponding to the PDSCH does not exists, there is a problem in that the implicit PUCCH resource described above may not be determined.

Accordingly, the base station may notify the PUCCH resource for ACK/NACK transmission by a method of assigning one of the plurality of resources though the ARI after pre-assigning the plurality of resources through the higher layer signal such as the RRC message. The PUCCH resource by the method is called an explicit PUCCH resource. The ARI may be included in the PDCCH activating the SPS and borrow a transmission power control (TPC) field.

In LTE-A, in the case of transmitting the ACK/NACK through the PUCCH format 1a/1b (alternatively, the PUCCH format 1a/1b with channel selection), the ACK/NACK for the PDSCH scheduled by the PDCCH positioned in a primary cell and the ACK/NACK for the PDCCH itself uses the PUCCH resource implicitly indicated from the PDCCH of the primary cell.

When the ACK/NACK for the PDSCH of a secondary cell scheduled by the PDCCH of the secondary cell to which non-cross carrier scheduling is applied and the ACK/NACK for the PDSCH without the corresponding PDCCH additionally exist, the ACK/NACK is transmitted by 1) selectively using an implicit PUCCH resource linked with the CCE index occupied by the PDCCH of the primary cell and an explicit PUCCH resource indicated by the ARI or 2) selectively using an explicit PUCCH resource for the PDSCH without the corresponding PDCCH and an explicit PUCCH resource for the secondary cell.

Meanwhile, all the ACK/NACKs are transmitted only to the primary cell. In the case of defining the PUCCH resource of the primary cell corresponding to the CCE occupied by the PDCCH of the secondary cell, collision with the PUCCH resource of the primary cell corresponding to the CCE occupied by the PDCCH of the primary cell may occur. In order to avoid the problem and a problem of unnecessarily ensuring more implicit PUCCH resources, mapping of the CCE and the implicit PUCCH resource is not defined between different carriers (cells). Further, in the case of the SPS, since there is no PDCCH, the implicit PUCCH resource corresponding to the CCE configuring the PDCCH may not be selected.

Figure 11:
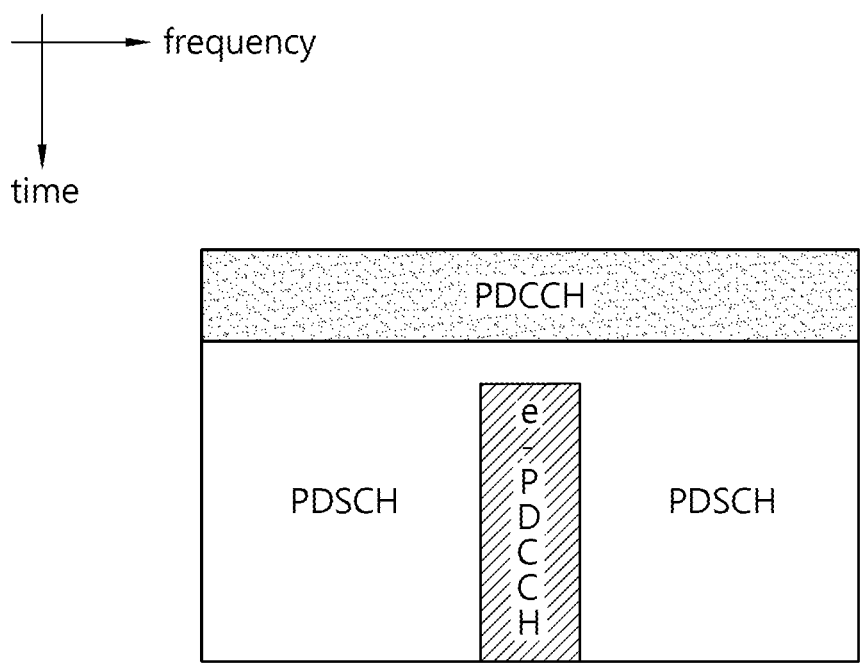
FIG. 11 illustrates one example of e-PDCCH allocation.

FIG. 11 illustrates one example of e-PDCCH allocation.

In LTE-A, assigning and using the enhanced-PDCCH (e-PDCCH; also referred to EPDCCH) which is a new control channel in the data area has been considered. The e-PDCCH also configures an enhanced-CCE (e-CCE) similarly to the PDCCH and may apply implicit PUCCH resource mapping based on the configured e-CCE. When the ARI is included in the e-PDCCH, an offset using the ARI may be used.

Figure 12:
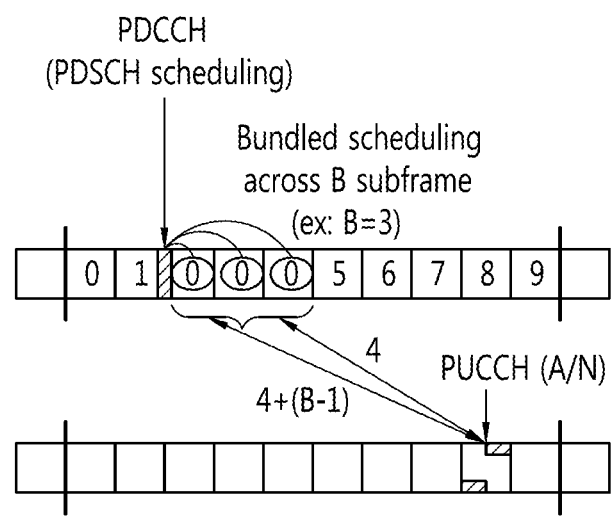
FIG. 12 illustrates an example of subframe bundled scheduling.

FIG. 12 illustrates an example of subframe bundled scheduling.

Referring to FIG. 12, one PDCCH schedules the PDSCHs transmitted in a plurality of subframes. In this case, when the number (that is, the number of subframes which may include PDSCHs scheduled by one PDCCH) of subframes which are simultaneously is B, B is be configured by RRC or is included in the PDCCH to be notified to the UE. A method for notifying B may be variously implemented. For example, the base station may notify how many consecutive subframes are used to transmit the PDSCH from the subframe in which the PDCCH is transmitted or whether the PDSCH of each subframe is scheduled in the form of bitmaps corresponding to B subframes, respectively. In the subframe bundled scheduling, the PDSCHs transmitted in the plurality of subframes may have the same HARQ process number (the HARQ process number is exemplified as 0 in FIG. 12).

Meanwhile, the subframe bundled scheduling may be designated only with respect to a specific subframe set by considering inter-cell interference coordination (ICIC). For example, the subframe bundled scheduling may be applied only to a set except for an almost blank subframe (ABS). Information on the subframe set to which the subframe bundled scheduling is applied may be broadcasted or signaled by the RRC.

Meanwhile, the subframe (that is, the subframe in which the PDSCH/PUSCH is transmitted) which may be scheduled by the subframe bundled scheduling may belong to a subframe set distinguished according to a specific reference. The subframe set may be determined according to the following reference.

For example, when the subframe set is distinguished into an e-PDCCH/PDCCH monitoring subframe set, a CSI subframe set, a CSI process target subframe set, a subframe set distinguished according to the length of the CP of each subframe, that is, a normal CP subframe set or an extended CP subframe set, the subframe set may be any one set of the distinguished sets. Alternatively, when the subframe set is distinguished into an MSBSFN subframe set and a normal subframe set, the subframe set may be any one set of both subframe sets.

Alternatively, when the subframe set is distinguished into a subframe set in which a positioning reference signal is present and a subframe set in which the positioning reference signal is not present, the subframe set may be any one set of both subframe sets. The distinguishment may be applied only to a case in which the length of the CP of the subframe in which the PRS is present is different from the length of the CP of a general subframe.

Alternatively, the subframe set may be a specific subframe set distinguished according to a PMCH is transmitted to each subframe or according to transmitted transmission power when application of the transmission power varies. For example, when a downlink transmission power level varies for each subframe, the subframe set may be configured for each transmission power level. Alternatively, an absolute or/and an accumulation value of uplink transmission power control (TPC) is/are set to be different from each other, the subframe set may be configured for each set value.

Alternatively, the subframe set is distinguished into a subframe in which a configuration to uplink/downlink is fixed or a subframe in which the configuration to the uplink/downlink is variable and thereafter, may be designated as any one set.

For example, it is assumed that 10 subframes are present in the frame and 10 subframes are sequentially indexed with 0 to 9. In this case, it is assumed that subframes 0, 1, 5, and 6 and subframes 2, 3, 4, 7, 8, and 9 are subframes having different characteristics (different characteristics in terms of the aforementioned references including, for example, the MBSFN subframe or not, the CP length, the presence of the PRS, the transmission power, the transmission of the PMCH or not, and the like). Then, subframes 0, 1, 5, and 6 may be a first subframe set and subframes 2, 3, 4, 7, 8, and 9 may be a second subframe set. In this case, when the subframe bundled scheduling (for example, 4 subframes are simultaneously scheduled) is applied and the PDCCH is transmitted in subframe 2, subframe 2 belongs to the second subframe set, and as a result, the PDSCHs may be transmitted in subframes 2, 3, 4, and 7.

The subframe set to which the subframe bundled scheduling may be applied may be applied only to scheduling of a downlink subframe or only to scheduling of an uplink subframe corresponding thereto.

Meanwhile, FIG. 12 illustrates a case in which one HARQ process is allocated to PDSCHs depending on the subframe bundled scheduling in FDD. That is, one transport block (TB) is transmitted throughout PDSCHs of a plurality of subframes and only one ACK/NACK response thereto is required. However, when spatial multiplexing is used, transport blocks as many as multiplexed codewords are transmitted throughout the plurality of PDSCHs. Therefore, the ACK/NACK may increase up to the number of transport blocks. Accordingly, in the case where only a single cell s configured, which is configured in a transmission mode of a maximum of 2 codewords, the user equipment may transmit the ACK/NACK by using the PUCCH format 1a/1b. Herein, in the case of B=1 as a resource for the PUCCH format 1a/1b, the implicit PUCCH resource may be used. On the contrary, in the case of B>1, since an implicit PUCCH resource between DL and UL is not defined, an explicit PUCCH resource indicated by the ARI is used among a plurality of (e.g., 4) explicit PUCCH resources reserved by the RRC.

When the SORTD is used, the ACK/NACK is transmitted by using a pair of explicit PUCCH resources indicated by the ARI among the plurality of (e.g., 4) pairs of explicit PUCCH resources reserved by the RRC.

In TDD, if mapping of the DL subframe in which the PDCCH is transmitted and the implicit PUCCH resource exists, the implicit PUCCH resource is used, and if not, the explicit PUCCH resource is used. However, in the case of TDD, since a plurality of DL subframes may correspond to one UL subframe, PUCCH format 3 or PUCCH format 1b using channel selection may be used.

FIG. 13 illustrates an example of cross subframe scheduling.

The cross subframe scheduling means scheduling the PDSCHs through the plurality of subframes by each of the plurality of PDCCHs included in the PDCCH area of one subframe. The PDSCHs transmitted in the plurality of subframes may have different HARQ process numbers (a case in which the HARQ process number is 0, 1, 2, and 2 is illustrated in FIG. 13).

FIG. 13A is an example of the FDD, and each ACK/NACK may be transmitted in each UL subframe corresponding to the DL subframe transmitted by each PDSCH.

In FIG. 13B, when downlink subframes scheduled by the PDCCH are referred to as a scheduling window, all ACKs/NACKs for the PDSCHs scheduled in the scheduling window may be transmitted in the UL subframe corresponding to a UL subframe (alternatively, a DL subframe in which the PDSCH is actually transmitted last in the scheduling window) corresponding to a last DL subframe of the scheduling window.

Meanwhile, in a method of FIG. 13A, in the case of operating in the single cell configuration, the ACK/NACK for each PDSCH may be transmitted to the PUCCH format 1a/1b in the corresponding UL subframe. The ACK/NACK for the PDSCH transmitted in the DL subframe in which the PDCCH is transmitted may be transmitted as the implicit PUCCH resource, while the PDSCHs transmitted in other DL subframes are transmitted by using the explicit PUCCH resource. The SORTD may also be applied as described above.

In the TDD, if mapping of the DL subframe in which the PDCCH is transmitted and the implicit PUCCH resource exists, the implicit PUCCH resource is used, and if not, the explicit PUCCH resource is used. When the SORTD is applied, in the allocation of the PUCCH resource, the aforementioned embodiments may be applied according to whether the PUCCH resource is an implicit resource or an explicit resource in transmission using the single antenna.

In the case where the method of FIG. 13A is applied to the TDD 2 cell configuration, the plurality of DL subframes may correspond to one UL subframe. In this case, the ACK/NACK may be transmitted by using the channel selection.

In the case of transmitting the ACK/NACK in the UL subframe which may use the implicit PUCCH resource corresponding to the control channel scheduled when scheduling the primary cell and the secondary cell from the control channels PDCCH and e-PDCCH of the primary cell, the implicit PUCCH resource is used, and in the case of transmitting the ACK/NACK in the UL subframe which may not use the implicit PUCCH resource, the explicit PUCCH resource is used. The method may be applied even in the case where the non-cross carrier scheduling is applied in the secondary cell.

For example, it is assumed that the implicit PUCCH resource may be ensured from the control channel scheduling the primary cell in the specific UL subframe. In this case, one implicit PUCCH resource or two implicit PUCCH resources may be used for the single antenna port. In the case where the implicit PUCCH resource in the specific UL subframe may not be ensured from the control channel scheduling the secondary cell in the same UL subframe, one explicit resource indicated by the ARI or an explicit PUCCH resource set indicated by the ARI (that is, a set of two PUCCH resources configured by the RRC or a set acquired by adding one PUCCH resource configured by the RRC and a PUCCH resource applied with the offset value based on the corresponding PUCCH resource) is used for the single antenna port.

When the SORTD is applied, in the case of ensuring the implicit resource with a resource for a first antenna port, two or a maximum of four implicit resources are used from the control channel scheduling each cell, and in the case of not ensuring the implicit resource as the resource for the first antenna port, one pair of explicit resources (that is, two explicit PUCCH resources) indicated by the ARI may be used as a resource for a second antenna port. Alternatively, two explicit resources indicated by the ARI are used for the first antenna port and the second antenna port, respectively.

Meanwhile, a method of FIG. 13B is an example of the FDD, and in the case of B>1, the ACKs/NACKs for the PDSCHs of the plurality of DL subframes need to be transmitted in one UL subframe. By counting the number of consecutive ACKs/NACKs among the ACKs/NACKs for the PDSCHs of the plurality of DL subframes, the value may be transmitted through the PUCCH format 1b or by using the PUCCH format 1b using the channel selection. Alternatively, the PUCCH format 3 may be used.

In the case of the single cell, the method of FIG. 13B may be applied only in the case of B>1 or applied regardless of B. In order to notify the selection of the explicit PUCCH resource, the ARI may be transmitted and the TPC field may be borrowed. For the ARI transmission, a separate field may be included, and particularly, in the case of the e-PDCCH, the ARI may be transmitted by using a HARQ-ACK resource offset (ARO) field.

Subframes to which the cross subframe scheduling may be applied may also belong to the subframe set distinguished according to the specific reference. The reference to distinguish the subframe set may be similar to the references described in the subframe bundled scheduling.

For example, it is assumed that 10 subframes are present in the frame and 10 subframes are sequentially indexed with 0 to 9. In this case, it is assumed that subframes 0, 1, 5, and 6 and subframes 2, 3, 4, 7, 8, and 9 are subframes having different characteristics (different characteristics in terms of the aforementioned references including, for example, the MBSFN subframe or not, the CP length, the presence of the PRS, the transmission power, the transmission of the PMCH or not, and the like). Then, subframes 0, 1, 5, and 6 may be a first subframe set and subframes 2, 3, 4, 7, 8, and 9 may be a second subframe set. In this case, when the cross subframe scheduling (for example, scheduling 4 subframes) is applied and the PDCCH is transmitted in subframe 6, subframe 6 belongs to the first subframe set, and as a result, the PDCCH may be constrained to scheduling PDSCHs 0, 1, 5, and 6.

In a carrier aggregation situation, the present invention may be applied even in the case where the PDSCH of the secondary cell is scheduled.

Which method of the methods of FIGS. 12 and 13 is used may be signaled by the base station.

Further, which method of the methods of FIGS. 13A and 13B is used may be signaled by the base station. The signaling may be broadcasted to the MIB and the SIB, configured by UE-specific RRC, or included in the DCI format transmitted through the PDCCH.

Further, the aforementioned methods may be applied for each site in the case of transmitting the ACK/NACK for each site in the carrier aggregation between different sites.

Meanwhile, in the subframe bundled scheduling, as illustrated in FIG. 13A, the ACK/NACK may be transmitted in each UL subframe corresponding to the DL subframe in which each PDSCH is transmitted and as illustrated in FIG. 13B, in the UL subframe corresponding to the last DL subframe of the scheduling window or the UL subframe corresponding to the DL subframe in which the last scheduled PDSCH is transmitted, the ACKs/NACKs for all PDSCHs scheduled in the scheduling window may be transmitted.

In the case of subframe bundled scheduling or cross-subframe scheduling the PUSCH, the base station transmits the ACK/NACK as illustrated in FIG. 13A and herein, the ACK/NACK may be transmitted through the PHICH. In this case, if the UE loses some of the PHICHs, ambiguity may occur in resource occupation of some subframes. Therefore, the PUSCH may be configured to be retransmitted not according to whether the ACK/NACK is received through the PHICH but by the UL grant.

Meanwhile, the PUSCH operates by the synchronous HARQ process and a fixed HARQ transmission timing is configured. However, in the case of the subframe bundled scheduling and/or cross-subframe scheduling, since a delay may occur between a receiving time of the UL grant and a transmitting time of the PUSCH, a problem may occur in applying a scheduling timing configured by the existing single subframe scheduling.

As a method for solving the problem, a UL HARQ timing applied to PUSCH repetition (TTI bundling) may be used (in this case, the UL HARQ timing may be applied to only of a UL/DL configuration of FDD or TDD in which the PUSCH repetition may be applied), or a retransmission timing may be arbitrarily set through an operation by asynchronous HARQ. To this end, a field the HARQ process number may be included in the UL grant. In order to prevent the DCI from being lengthened due to addition of the field, the HARQ process numbers may be used to correspond to (all or some of) DM-RS field values. Alternatively, the HARQ process numbers may be constituted by combinations of the DM-RS fields and other fields.

Figure 14:
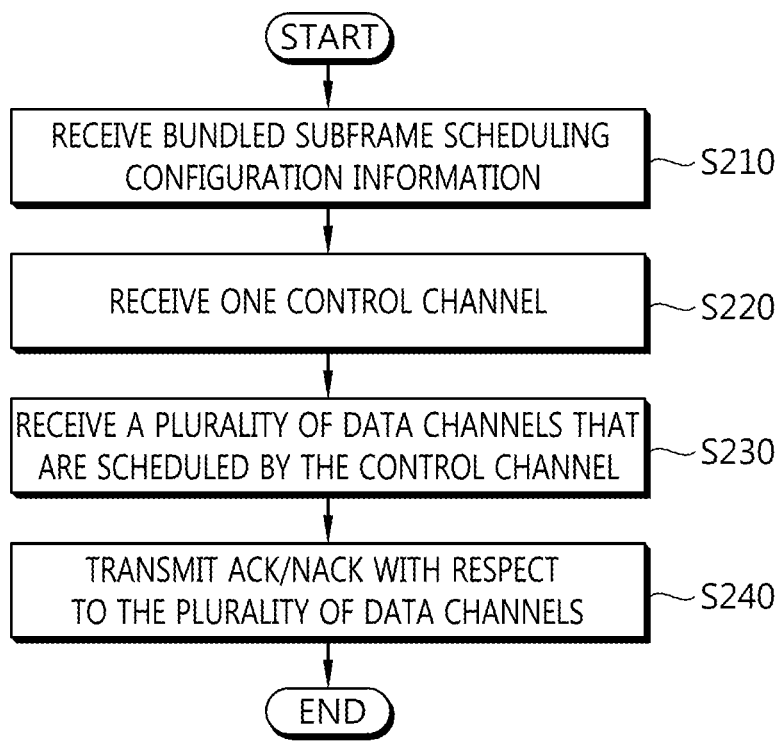
FIG. 14 illustrates a method for transmitting an ACK/NACK by UE according to an embodiment of the present invention.

FIG. 14 illustrates a method for transmitting an ACK/NACK by UE according to an embodiment of the present invention.

Referring to FIG. 14, the UE receives configuration information of the subframe bundled scheduling (S210). The configuration information may include on a subframe set to which the subframe bundled scheduling is applied. The configuration information may be transmitted through an RRC message or broadcasted system information. The subframe set to which the subframe bundled scheduling is applied may be determined based on the CP length or the presence of the positioning reference signal (PRS) or not of the downlink subframe or based on a transmission power value of the downlink subframe. Alternatively, the subframe set may be determined based on whether a physical multicast channel (PMCH) is transmitted in the downlink subframe.

The UE receives one control channel (S220) and receives a plurality of data channels scheduled by the control channel (S230).

The control channel may be the PDCCH or the EPDCCH. The control channel may include the downlink grant scheduling the plurality of data channels. Further, the control channel may include even the uplink grant including information indicating the uplink subframe transmitting the ACK/NACK for the plurality of data channels.

The uplink subframe may be indicated by the HARQ process number. The HARQ process number may be indicated by an independent field in a separate uplink grant, but is not limited thereto and may be indicated by adopting the existing field. For example, a DM-RS field indicating a cyclic shift value of the DM-RS to be applied to the uplink subframe exists in the uplink grant. When a value of the DM-RS field and the HARQ process number are mapped, the HARQ process number may be indicated by the DM-RS field without the independent field. In the existing TDD downlink, a 4-bit independent HARQ process number field is used for the HARQ process number, but in the present invention, the HARQ process number may be notified by adopting the DM-RS (3-bit) field in the uplink grant. In this case, since the number of bits of the DM-RS field is 3 bits, the maximum number of HARQ process numbers may be limited to 8.

As described above, the UE receives data channels by the subframe bundled scheduling.

The UE transmits ACKs/NACKs for the plurality of data channels (S240). The uplink subframe transmitting the ACK/NACK may be determined based on the HARQ process number mapped to the DM-RS field value included in the uplink grant. That is, when the subframe bundled scheduling is applied, the UE may transmit the ACK/NACK through the uplink subframe determined based on the HARQ process number directly/indirectly indicated by the uplink grant. In the related art, the UE operates by the synchronous HARQ in the uplink, but in the present invention, the UE operates by the asynchronous HARQ in the uplink.

Meanwhile, in FIG. 14, the subframe bundling scheduling is illustrated, but is not limited thereto. That is, in FIG. 14, the cross-subframe scheduling may be used instead of the subframe bundled scheduling.

Figure 15:
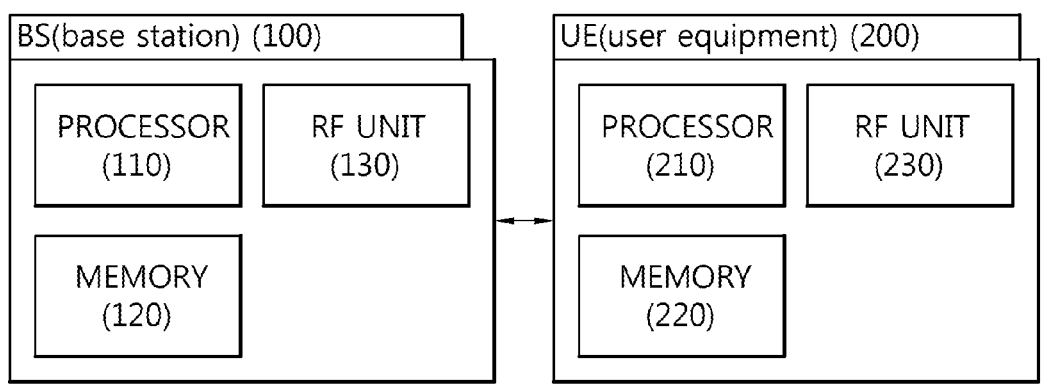
FIG. 15 illustrates configurations of a base station and UE according to an embodiment of the present invention.

FIG. 15 illustrates configurations of a base station and UE according to an embodiment of the present invention.

A base station 100 includes a processor 110, a memory 120, and a radio frequency (RF) unit 130. The processor 110 implements a function, a process, and/or a method which are proposed. For example, the processor 110 may perform subframe bundled scheduling or cross-subframe scheduling. Further, the processor 110 may receive ACKs/NACKs for data channels subjected to the subframe bundled scheduling or cross-subframe scheduling. The memory 120 is connected with the processor 110 to store various information for driving the processor 110. The RF unit 130 is connected with the processor to transmit and/or receive a radio signal.

UE 200 includes a processor 210, a memory 220, and an RF unit 230. The processor 210 implements a function, a process, and/or a method which are proposed. For example, the processor 210 may receive a downlink grant in a first downlink subframe and receive a plurality of data channels scheduled by the downlink grant in a plurality of downlink subframes. The plurality of downlink subframes may be included in any one of predetermined downlink subframe sets. The downlink subframe sets may be configured based on the aforementioned references including the CP length and the presence of the positioning reference signal (PRS) or not of the downlink subframe, the transmission power value, whether the physical multicast channel (PMCH) is transmitted, and the like. Further, the downlink subframe sets are predetermined to be signaled to the UE. The contents have been described above. The memory 220 is connected with the processor 210 to store various information for driving the processor 210. The RF unit 230 is connected with the processor 210 to transmit and/or receive a radio signal.

The processors 110 and 210 may include an application-specific integrated circuit (ASIC), other chipset, a logic circuit, a data processing device, and/or a converter that converts a baseband signal and the radio signal to each other. The memories 120 and 220 may include a read-only memory (ROM), a random access memory (RAM), a flash memory, a memory card, a storage medium, and/or another storage device. The RF units 130 and 230 may include one or more antennas that transmit and/or receive the radio signal. When the embodiment is implemented by software, the aforementioned technique may be implemented by a module (a process, a function, and the like) that performs the aforementioned function. The module may be stored in the memories 120 and 220 and may be executed by the processors 110 and 210. The memories 120 and 220 may be present inside or outside the processors 110 and 210 and connected with the processors 110 and 210 by various well-known means.

What is claimed is:

1. A communication method for a terminal in a wireless communication system, the method comprising:
   receiving a downlink grant in a first downlink subframe; and
   receiving a plurality of data channels scheduled by the downlink grant in a plurality of downlink subframes,
   wherein the plurality of downlink subframes are included in any one of predetermined downlink subframe sets,
   wherein the downlink subframe sets are determined based on a cyclic prefix (CP) length and the presence of a positioning reference signal (PRS) of a downlink subframe,
   wherein:
      an uplink grant is received in the first downlink subframe,
      acknowledgements/non-acknowledgements (ACKs/NACKs) for the plurality of data channels are transmitted in a first uplink subframe, and
      the uplink grant includes information indicating the first uplink subframe,
   wherein the first uplink subframe is determined according to a hybrid automatic repeat request (HARQ) process number indicated by the uplink grant, and
   wherein the HARQ process number is determined according to a value of a demodulation reference signal (DM-RS) field included in the uplink grant.

2. The method of claim 1, wherein the DM-RS field is a field indicating a cyclic shift value of the DM-RS to be applied to the first uplink subframe.

3. The method of claim 1, wherein the DM-RS field is constituted by 3 bits.

4. The method of claim 1, wherein the downlink subframe sets are predetermined to be signaled to the terminal.

5. A terminal, comprising:
   a radio frequency (RF) unit configured to transmit or receive a radio signal; and
   a processor connected with the RF unit, the processor being configured to:

receive a downlink grant in a first downlink subframe; and receive a plurality of data channels scheduled by the downlink grant in a plurality of downlink subframes, wherein the plurality of downlink subframes are included in any one of predetermined downlink subframe sets, wherein the downlink subframe sets are determined based on a cyclic prefix (CP) length and the presence of a positioning reference signal (PRS) of a downlink subframe, wherein:
an uplink grant is received in the first downlink subframe,
acknowledgements/non-acknowledgements (ACKs/NACKs) for the plurality of data channels are transmitted in a first uplink subframe, and
the uplink grant includes information indicating the first uplink subframe,
wherein the first uplink subframe is determined according to a hybrid automatic repeat request (HARQ) process number indicated by the uplink grant, and
wherein the HARQ process number is determined according to a value of a demodulation reference signal (DM-RS) field included in the uplink grant.

6. The terminal of claim 5, wherein the DM-RS field is a field indicating a cyclic shift value of the DM-RS to be applied to the first uplink subframe.

7. The terminal of claim 5, wherein the DM-RS field is constituted by 3 bits.

8. The terminal of claim 5, wherein the downlink subframe sets are predetermined to be signaled to the terminal.

9. A communication method for a terminal in a wireless communication system, the method comprising:
receiving a downlink grant in a first downlink subframe; and
receiving a plurality of data channels scheduled by the downlink grant in a plurality of downlink subframes,
wherein the plurality of downlink subframes are included in any one of predetermined downlink subframe sets,
wherein:
an uplink grant is received in the first downlink subframe,
acknowledgements/non-acknowledgements (ACKs/NACKs) for the plurality of data channels are transmitted in a first uplink subframe, and
the uplink grant includes information indicating the first uplink subframe,
wherein the first uplink subframe is determined according to a hybrid automatic repeat request (HARQ) process number indicated by the uplink grant, and
wherein the HARQ process number is determined according to a value of a demodulation reference signal (DM-RS) field included in the uplink grant.

10. The method of claim 9, wherein the DM-RS field is a field indicating a cyclic shift value of the DM-RS to be applied to the first uplink subframe.

11. The method of claim 9, wherein the DM-RS field is constituted by 3 bits.

* * * * *